(12) United States Patent
Shrivastava et al.

(10) Patent No.: US 12,657,928 B2
(45) Date of Patent: Jun. 16, 2026

(54) APPROXIMATELY-PAIRED SIMULATION-TO-REAL IMAGE TRANSLATION

(71) Applicant: GM CRUISE HOLDINGS LLC, San Francisco, CA (US)

(72) Inventors: Ashish Shrivastava, San Jose, CA (US); Charles Yingjia Zhang, Ottawa (CA)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 684 days.

(21) Appl. No.: 18/172,823

(22) Filed: Feb. 22, 2023

(65) Prior Publication Data

US 2024/0282117 A1 Aug. 22, 2024

(51) Int. Cl.
*G06V 20/58* (2022.01)
*B60W 60/00* (2020.01)

(52) U.S. Cl.
CPC ........... *G06V 20/58* (2022.01); *B60W 60/001* (2020.02); *B60W 2420/403* (2013.01)

(58) Field of Classification Search
CPC ...... G06V 20/58; G06V 10/82; G06V 10/774; G06V 10/764; G06V 10/7715; G06V 10/40; G06V 10/776; B60W 60/001; B60W 2420/403; G06N 3/045; G06N 3/08; G06N 3/0464; G06N 3/047; G06N 3/0475; G06N 3/084; G06N 3/09; G06N 3/094; G06N 3/0455; G06N 3/088; G06N 3/0895; G06N 3/096; G06T 2207/20081; G06T 2207/20084; G06T 11/00; G06T 11/10; G06T 5/60; G06T 11/60;
(Continued)

(56) References Cited

U.S. PATENT DOCUMENTS

| | | | | |
|---|---|---|---|---|
| 10,242,292 B2 * | 3/2019 | Zisimopoulos | .......... | G06N 3/08 |
| 11,048,974 B2 * | 6/2021 | Zhong | .................. | G06V 10/771 |
| 11,341,699 B1 * | 5/2022 | Gottlieb | .................. | G06T 11/60 |

(Continued)

OTHER PUBLICATIONS

I Akkaya et al., "Solving rubik's cube with a robot hand," arXiv preprint arXiv: 1910.07113, 2019.
(Continued)

*Primary Examiner* — Michael S Osinski
(74) *Attorney, Agent, or Firm* — CANTOR COLBURN LLP

(57) ABSTRACT

Disclosed are embodiments for facilitating approximately-paired simulation-to-real image translation. In some aspects, a method includes receiving, by a processing device performing training on a model, an approximately-paired image pair comprising a real image and a simulated image, wherein the simulated image is generated from the real image using contextual data of the real image; determining, by the processing device using a style encoder of the model, a style difference between a first style vector of the simulated image and a second style vector of the real image, wherein the first style vector and the second style vector encode style features of the simulated image and the real image using a style encoder; and inputting the style difference and the simulated image to a generative adversarial network (GAN) of the model to train the GAN to generate a post-processed simulated image.

20 Claims, 9 Drawing Sheets

(58) Field of Classification Search

CPC ... G06T 2207/10016; G06T 5/50; G06T 5/94; G06T 7/00

See application file for complete search history.

(56) References Cited

U.S. PATENT DOCUMENTS

| | | | | |
|---|---|---|---|---|
| 12,530,032 | B2 * | 1/2026 | Newman | A01B 1/00 |
| 12,530,588 | B2 * | 1/2026 | Du | G06N 3/084 |
| 2018/0300850 | A1 * | 10/2018 | Johnson | G06N 3/08 |
| 2018/0314716 | A1 * | 11/2018 | Kim | G06F 16/51 |
| 2018/0373999 | A1 * | 12/2018 | Xu | G06N 20/00 |
| 2019/0042882 | A1 * | 2/2019 | Kim | G06N 3/088 |
| 2020/0074674 | A1 * | 3/2020 | Guo | G06V 20/54 |
| 2020/0167606 | A1 * | 5/2020 | Wohlhart | B25J 9/161 |
| 2020/0311986 | A1 * | 10/2020 | Tong | G06N 3/088 |
| 2020/0342276 | A1 * | 10/2020 | Lee | G06V 10/7715 |
| 2021/0019629 | A1 * | 1/2021 | Chidlovskii | G06V 10/82 |
| 2021/0056343 | A1 * | 2/2021 | Toizumi | G06F 18/214 |
| 2021/0089903 | A1 * | 3/2021 | Murray | G06F 18/2132 |
| 2021/0209464 | A1 * | 7/2021 | Bala | G06T 11/10 |
| 2021/0215818 | A1 * | 7/2021 | Kim | G06V 10/82 |
| 2021/0358115 | A1 * | 11/2021 | Hever | G06N 3/088 |
| 2022/0180189 | A1 * | 6/2022 | Adrian | G06N 3/0464 |
| 2022/0237829 | A1 * | 7/2022 | Ren | G06T 11/00 |
| 2022/0309674 | A1 * | 9/2022 | Zhang | G16H 30/40 |
| 2023/0055538 | A1 * | 2/2023 | Miron | G06V 10/774 |
| 2023/0114734 | A1 * | 4/2023 | Moon | G06N 3/09 |
| | | | | 382/103 |
| 2023/0154165 | A1 * | 5/2023 | Park | G06V 10/82 |
| | | | | 382/128 |
| 2023/0230242 | A1 * | 7/2023 | Lorsakul | G06V 20/698 |
| | | | | 382/128 |
| 2024/0161444 | A1 * | 5/2024 | Das | G06T 5/50 |
| 2024/0161445 | A1 * | 5/2024 | Fujiwaka | H04N 19/136 |
| 2024/0185075 | A1 * | 6/2024 | Du | H04N 19/521 |
| 2024/0303838 | A1 * | 9/2024 | Dana | G06T 9/00 |
| 2024/0303973 | A1 * | 9/2024 | Ramos Dos Santos | |
| | | | | G06V 10/774 |
| 2025/0095112 | A1 * | 3/2025 | Chen | G06T 5/60 |
| 2025/0363681 | A1 * | 11/2025 | Wang | G06T 11/10 |
| 2026/0017531 | A1 * | 1/2026 | Lou | G06N 3/094 |

OTHER PUBLICATIONS

J. Lee et al., "Learning quadrupedal locomotion over challenging terrain," Science robotics, 2020.

W. Wang et al., "Tartanair: A dataset to push the limits of visual slam," in Proc. IROS, 2020.

E. Wood et al, "Fake it till you make it: Face analysis in the wild using synthetic data alone," in Proc. ICCV, 2021.

M. Haiderbhai et al., "Robust sim2real transfer with the da vinci research kit: A study on camera, lighting, and physics domain randomization," in Proc. IROS, 2022.

A. Shrivastava et al., "Learning from simulated and unsupervised images through adversarial training," in Proc. CVPR, 2017.

T. Park et al., "Contrastive learning for unpaired image-to-image translation," in Proc. ECCV, 2020.

J.-Y. Zhu et al., "Unpaired image-to-image translation using cycle-consistent adversarial networks," in Proc. ICCV, 2017.

I. Goodfellow et al., "Generative adversarial nets," in Proc. NeuRIPS, 2014.

A. Brock et al., "Large scale GAN training for high fidelity natural image synthesis," in Proc. ICLR, 2019.

X. Huang et al., "Arbitrary style transfer in real-time with adaptive instance normalization," in Proc. ICCV, 2020.

A. Karnewar et al., "MSG-GAN: Multi-scale gradients for generative adversarial networks," in Proc. CVPR, 2020.

T. Karras et al., "Progressive growing of GANs for improved quality, stability, and variation," in Proc. ICLR, 2018.

T. Karras et al., "A style-based generator architecture for generative adversarial networks," in Proc. CVPR, 2019.

I. Gulrajani et al., "Improved Training of Wasserstine GAN," in Proc. NeuRIPS, 2017.

H. Zhang et al., "Self-attention generative adversarial networks," CoRR, abs/1805.08318, 2018.

H. Zhang et al., "Stackgan: Text to photo-realistic image synthesis with stacked generative adversarial networks," in Proc. ICCV, 2017.

H. Zhang et al., "StackGAN++: Realistic image synthesis with stacked generative adversarial networks," CoRR, vol. abs/1710. 10916, 2017.

M.-Y. Liu et al., "Coupled generative adversarial networks," in Proc. NeuRIPS, 2016.

X. Mao et al., "Multi-class generative adversarial networks with the L2 loss function," in Proc. ICCV, 2016.

T. Karras et al., "Alias-free generative adversarial networks," in Proc. NeuRIPS, 2021.

P. Isola "Image-to-image translation with conditional adversarial networks," in Proc. CVPR, 2017.

Y. Qu et al., "Enhanced pix2pix dehazing network," in Proc. CVPR, 2019.

T. Wang et al., "High-resolution image synthesis and semantic manipulation with conditional gans," in Proc. CVPR, 2020.

S. Kim et al., "InstaFormer: Instance-aware image-to-image translation with transformer," in Proc. CVPR, 2022.

P. Sangkloy et al., "Scribbler: Controlling deep image synthesis with sketch and color," in Proc. CVPR, 2017.

L. Karacan et al., "Learning to generate images of outdoor scenes from attributes and semantic layouts," CoRR, vol. abs/1612.00215, 2016.

S. Yang et al., "Unsupervised image-to-image translation with generative prior," in Proc. CVPR, 2022.

M. Ko et al., "Self-supervised dense consistency regularization for image-to-image translation," in Proc. CVPR, 2022.

S. Tripathy et al., "Learning image-to-image translation using paired and unpaired training samples," in Proc. ACCV, 2019.

A. Mustafa et al., "Transformation consistency regularization- A semi-supervised paradigm for image-to-image translation," in Proc. ECCV, 2020.

S. Benaim et al., "One-sided unsupervised domain mapping," in Proc. NeuRIPS, 2017.

K. He et al., "Deep residual learning for image recognition," in Proc. CVPR, 2016.

T. Karras et al., "Analyzing and improving the image quality of StyleGAN," in Proc. CVPR, 2020.

M. Heusel et al., "GANs trained by a two time-scale update rule converge to a nash equilibrium," CoRR, vol. abs/1706.08500, 2017.

A. Sauer et al., "Projected GANs con-verge faster," in Advances in Neural Information Processing Systems, 2021.

I. J. Goodfellow, "NIPS 2016 tutorial: Generative adversarial networks," CoRR, vol. abs/1701.00160, 2017.

D. P. Kingma et al., "Adam: A method for stochastic optimiza-tion," in ICLR, 2015.

Y. Yazici et al., "The unusual effectiveness of averaging in GAN training," CoRR, vol. abs/1806.04498, 2018.

Wikipedia, "Variational autoencoder", downloaded on Jan. 24, 2023, https://en.wikipedia.org/wiki/Varionational_autoencoder, 7 pages.

* cited by examiner

Figure 4:
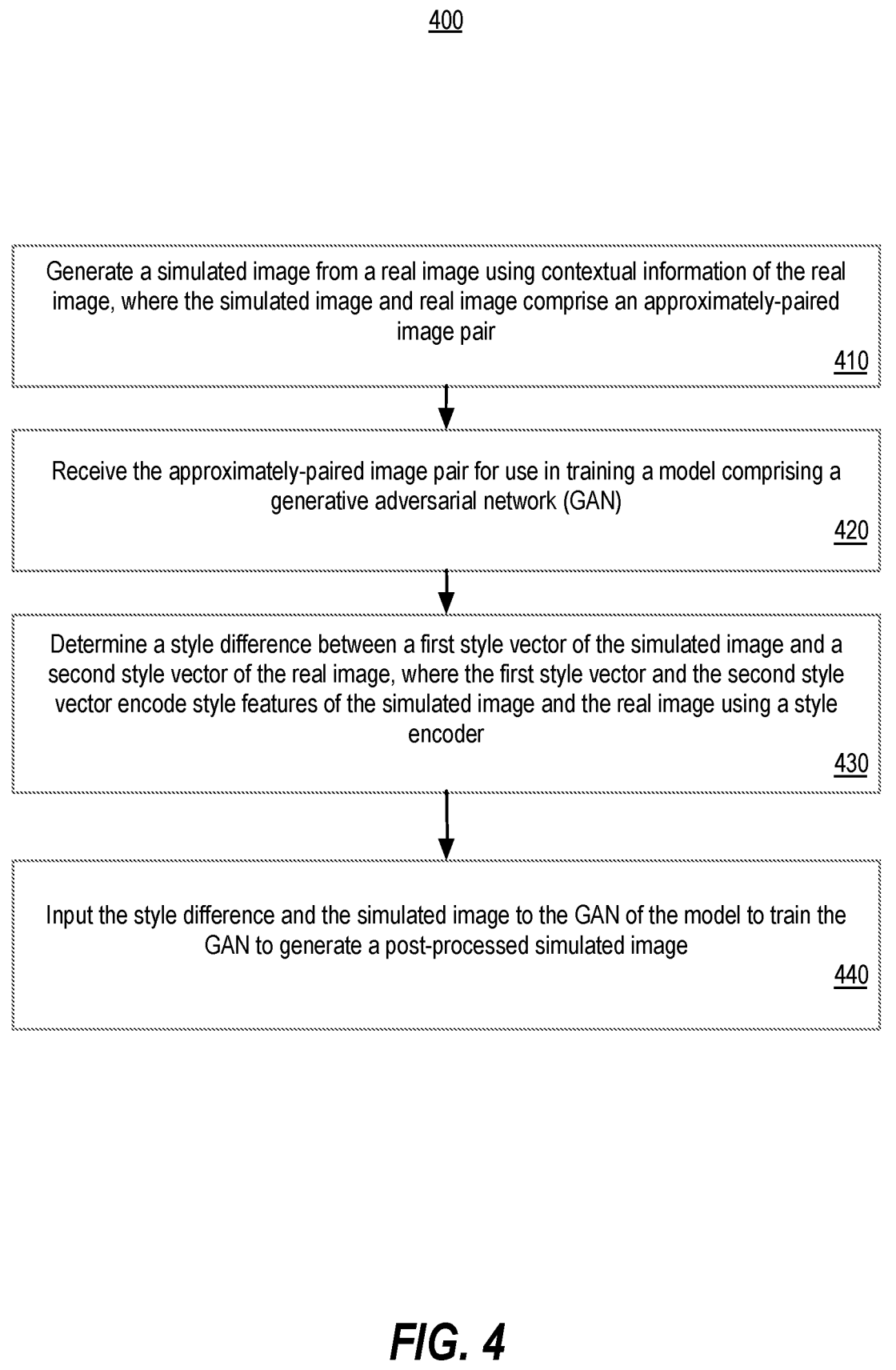

400

Generate a simulated image from a real image using contextual information of the real image, where the simulated image and real image comprise an approximately-paired image pair

410

Receive the approximately-paired image pair for use in training a model comprising a generative adversarial network (GAN)

420

Determine a style difference between a first style vector of the simulated image and a second style vector of the real image, where the first style vector and the second style vector encode style features of the simulated image and the real image using a style encoder

430

Input the style difference and the simulated image to the GAN of the model to train the GAN to generate a post-processed simulated image

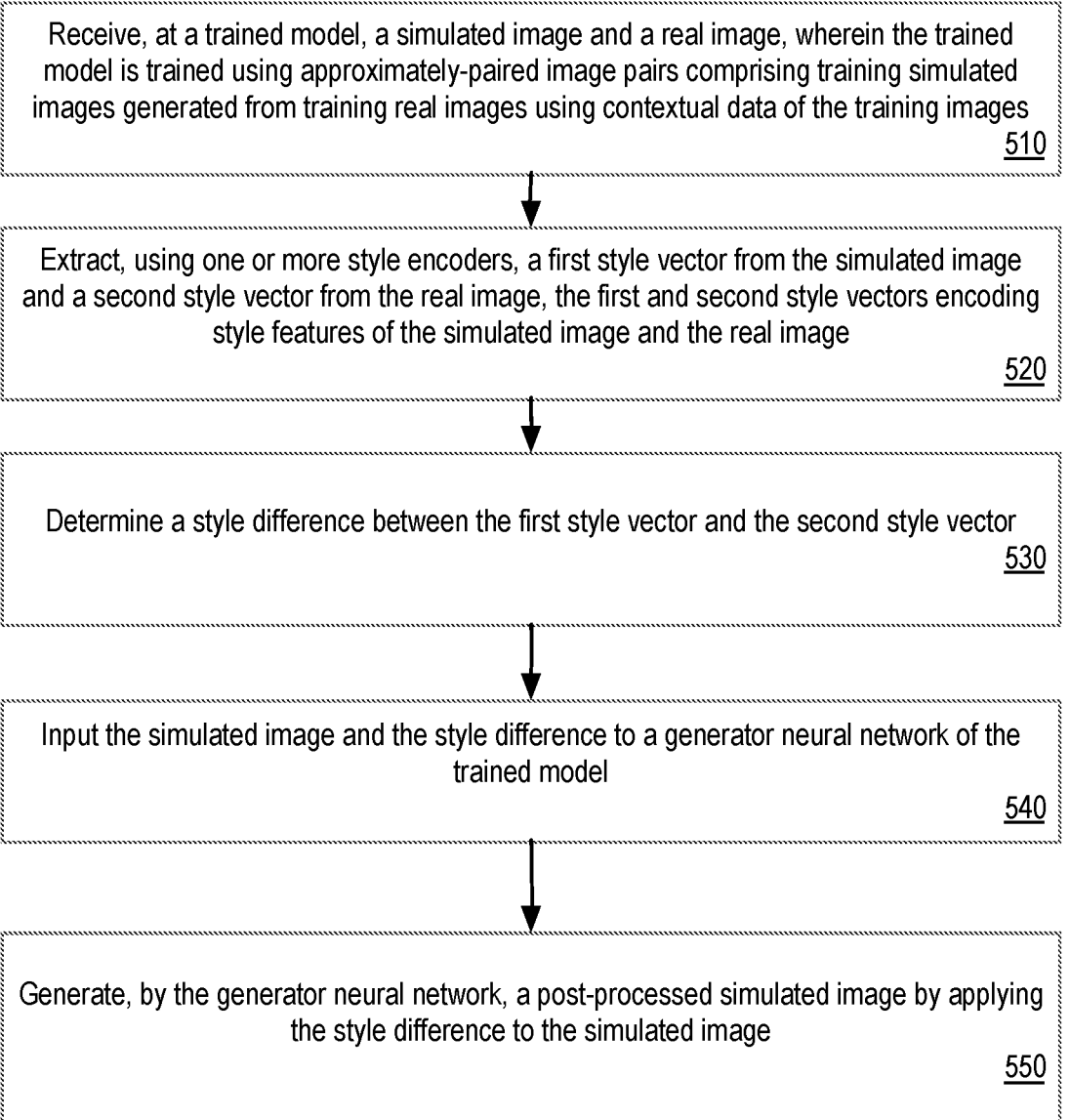

Receive, at a trained model, a simulated image and a real image, wherein the trained model is trained using approximately-paired image pairs comprising training simulated images generated from training real images using contextual data of the training images
510

Extract, using one or more style encoders, a first style vector from the simulated image and a second style vector from the real image, the first and second style vectors encoding style features of the simulated image and the real image
520

Determine a style difference between the first style vector and the second style vector
530

Input the simulated image and the style difference to a generator neural network of the trained model
540

Generate, by the generator neural network, a post-processed simulated image by applying the style difference to the simulated image
550

*FIG. 5*

APPROXIMATELY-PAIRED SIMULATION-TO-REAL IMAGE TRANSLATION

BACKGROUND

1. Technical Field

The disclosure generally relates to the field of processing systems and, more specifically, to approximately-paired simulation-to-real image translation.

2. Introduction

Autonomous vehicles, also known as self-driving cars, driverless vehicles, and robotic vehicles, may be vehicles that use multiple sensors to sense the environment and move without a human driver. An example autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system.

BRIEF DESCRIPTION OF THE DRAWINGS

The various advantages and features of the disclosed technology will become apparent by reference to specific implementations illustrated in the appended drawings. A person of ordinary skill in the art will understand that these drawings show some examples of the disclosed technology and would not limit the scope of the disclosed technology to these examples. Furthermore, the skilled artisan will appreciate the principles of the disclosed technology as described and explained with additional specificity and detail through the use of the accompanying drawings in which:

FIG. 4 illustrates an example method implementing training for approximately-paired simulation-to-real image translation, in accordance with embodiments herein;

FIG. 5 illustrates an example method for implementing inference for approximately-paired simulation-to-real image translation, in accordance with embodiments herein;

DETAILED DESCRIPTION

Figure 1:
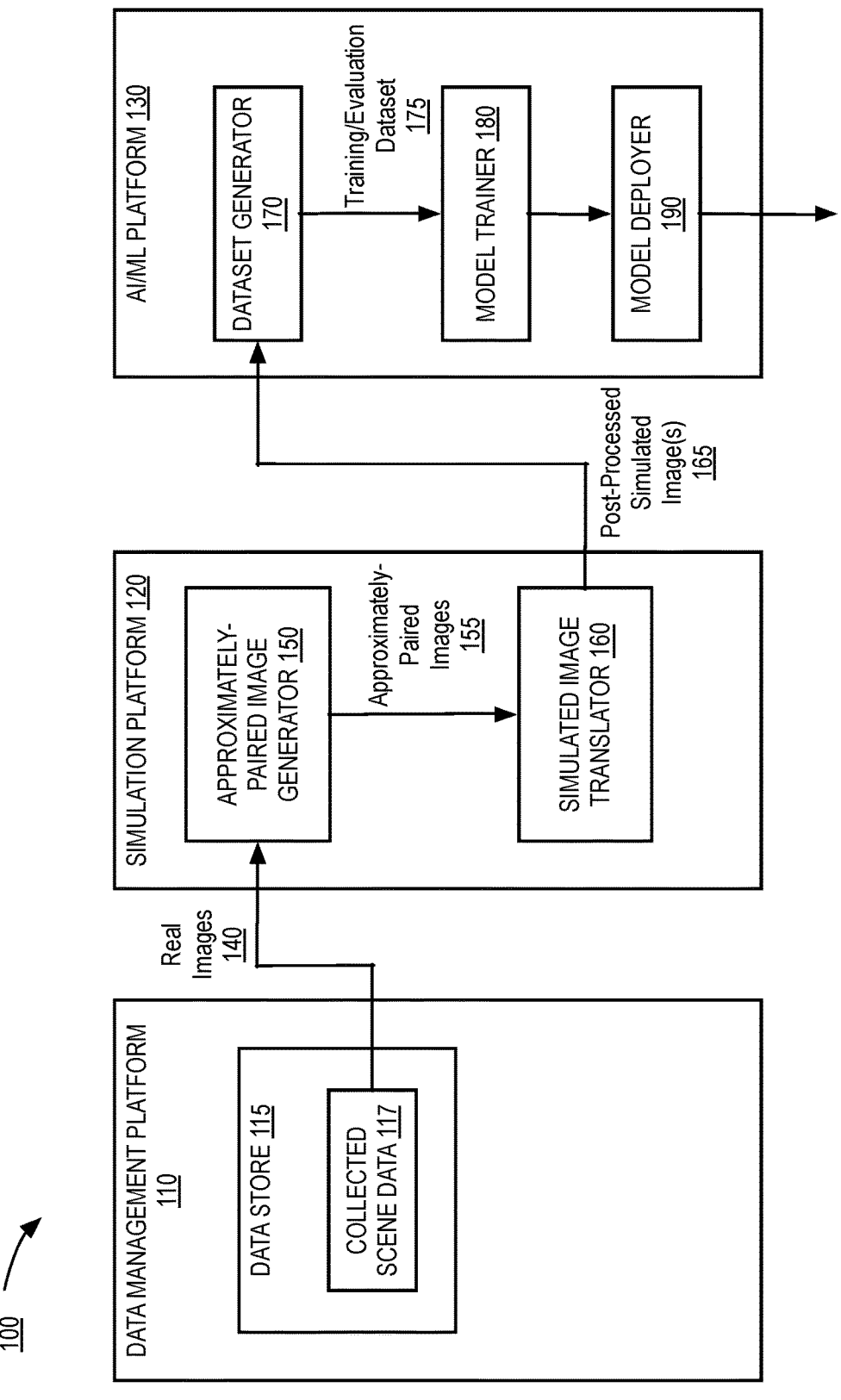
FIG. 1 is a block diagram of an example system illustrating utilization of approximately-paired simulation-to-real image translation, in accordance with embodiments herein.

The detailed description set forth below is intended as a description of various configurations of the subject technology and is not intended to represent the configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Autonomous vehicles (AVs), also known as self-driving cars, driverless vehicles, and robotic vehicles, can be implemented by companies to provide self-driving car services for the public, such as taxi or ride-hailing (e.g., ridesharing) services. The AV can navigate about roadways without a human driver based upon sensor signals output by sensor systems deployed on the AV. AVs may utilize multiple sensors to sense the environment and move without a human driver. An example AV can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system.

AVs can utilize one or more trained machine learning (ML)-based models that autonomously control and/or operate the vehicle. The trained model(s) can utilize the data and measurements captured by the sensors of the AV to identify, classify, and/or track objects (e.g., vehicles, people, stationary objects, structures, animals, etc.) within the AV's environment. The model(s) utilized by the AV may be trained using any of various suitable types of learning, such as deep learning (also known as deep structured learning). Deep learning is part of a broader family of machine learning methods based on artificial neural networks with representation learning. The learning can be supervised, semi-supervised, or unsupervised, and may be trained using real-world image data and/or image data generated in a simulated environment that have been labeled according to "correct" outputs of one or more perception functions (e.g., segmentation, classification, and/or tracking) of the AV.

Neural networks, such as those utilized in deep learning, are achieving state of the art and sometimes super-human performance on learning tasks across a variety of domains. Whenever these tasks utilize learning in a continual or sequential manner, however, neural networks can suffer from the problem of catastrophic forgetting (also known as catastrophic interference). Catastrophic forgetting occurs when the neural network forgets how to solve a previous task after being trained on a new task, despite having the capacity to solve both tasks if the neural network was trained on both simultaneously. In other words, catastrophic forgetting refers to a tendency of an artificial neural network to forget previously-learned information upon learning new information. Catastrophic forgetting can be problematic in the field of autonomous driving, for example, when myriad tasks are to be performed by the same network and data is changing. The compute, memory, and storage overheads of continuing to train multitask models from scratch with all of the data quickly becomes an untenable policy.

Advancements in graphics and simulation technology have increased the use of simulated data for training and validating machine learning models, especially for tasks where real world data is costly or impossible to acquire. In particular, training visual detection and understanding algorithms on synthetic (simulated or sim) image data can produce immense gains for a robotic system. However, the simulated data often differs from real-world data, creating a distribution gap that can decrease the efficacy of models trained on simulation data in real-world applications. To mitigate this gap, sim-to-real domain transfer modifies simulated images to better match real-world data, enabling the effective use of simulation data in model training.

Paired image translation trains a model to translate images between source and target domains, where each source image has a corresponding paired target image with pixel-wise correspondences. This approach results in high accuracy, but paired data is often difficult and expensive to obtain. In contrast, the unpaired image translation methods train a model with no correspondences between source and target images. This approach is more challenging but benefits from a higher availability of data.

To address these above-noted technical problems and challenges, embodiments herein provide for approximately-paired simulation-to-real image translation. With approximately-paired simulation-to-real image translation, the source and target images do not have to be exactly paired. Instead, approximately-paired simulation-to-real image translation takes advantage of the fact that simulators can generate scenes that loosely resemble real world scenes in terms of lighting, environment, and composition. This loose resemblance to real world scenes in terms of lighting, environment, and composition is referred to herein as an approximate pairing. Embodiments herein leverage this approximate pairing and can result in qualitative and quantitative improvements in the domain gap of simulation-to-real domain transfer methods.

The approximately-paired simulation-to-real image translation of embodiments herein utilizes "approximately-paired" data that shares contextual information, such as camera pose, map location, scene composition, lighting, etc., while allowing some variations in assets, textures, and shapes. For each real image (source image), embodiments use metadata and label information of the real image to generate a corresponding simulated image (target image). The simulated images mirror the camera pose of the real images and are generated by combining assets and models similar to those in the real image with a procedurally-generated background and matching lighting. Like unpaired translation, this approach allows for scalable data generation while providing some pairing between the source and target domain images that can be drawn upon in the model architecture.

The goal of sim-to-real training is to mimic the real images as closely as possible. But, due to limitations of the simulation, an exact match is not achieved. To further improve the matching, the approximately-paired simulation-to-real image translation of embodiments herein computes the difference between the simulation and real image styles using a learned style encoder. The style encoder is designed so that the difference of style features can capture the differences in lighting, contrast, camera noise, scene fidelity, and other details. This difference in style features between the simulated image and the corresponding real image is used as an additional input to a generator network to guide image translation and improve the realism of the simulated image. Unlike previous image translation methods, embodiments herein leverages an additional style input and makes the translation task easier by utilizing the model to learn how to apply the difference, rather than what the difference is. In comparison, existing translation models encode the domain difference in their parameters, which makes the translation task more challenging.

Although some embodiments herein are described as operating in an AV, other embodiments may be implemented in an environment that is not an AV, such as, for example, other types of vehicles (human operated, driver-assisted vehicles, etc.), air and terrestrial traffic control, radar astronomy, air-defense systems, anti-missile systems, marine radars to locate landmarks and other ships, aircraft anti-collision systems, ocean surveillance systems, outer space surveillance and rendezvous systems, meteorological precipitation monitoring, altimetry and flight control systems, guided missile target locating systems, ground-penetrating radar for geological observations, and so on. Furthermore, other embodiments may be more generally implemented in any artificial intelligence and/or machine learning-type environment. The following description discussed embodiments as implemented in an automotive environment, but one skilled in the art will appreciate that embodiments may be implemented in a variety of different environments and use cases. Further details of the approximately-paired simulation-to-real image translation of embodiments herein are further described below with respect to FIGS. 1-8.

FIG. 1 is a block diagram of an example system 100 illustrating utilization of approximately-paired simulation-to-real image translation, in accordance with embodiments herein. In one embodiment, system 100 implements a simulation platform for providing approximately-paired simulation-to-real image translation, as described further herein. The system 100 of FIG. 1 can be, for example, part of a data center that is cloud-based or otherwise. In other examples, the system 100 can be part of an AV or a human-operated vehicle having an advanced driver assistance system (ADAS) that can utilize various sensors including radar sensors.

In one embodiment, system 100 can communicate over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.). In one embodiment, system 100 can be implemented using a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth.

The system 100 may be part of a data center for managing a fleet of AVs and AV-related services. The data center can send and receive various signals to and from an AV. These signals can include sensor data captured by the sensor systems of the AV, roadside assistance requests, software updates, ridesharing pick-up and drop-off instructions, and so forth. In some examples, the system 100 may be hosted in a data center that may also support a ridesharing service, a delivery service, a remote/roadside assistance service, street services (e.g., street mapping, street patrol, street cleaning, street metering, parking reservation, etc.), and the like. In some embodiments, the system 100 may be implemented in the AV itself or may be implemented in a server computing device.

In this example, the system 100 includes one or more of a data management platform 110, a simulation platform 120, and an Artificial Intelligence/Machine Learning (AI/ML) platform 130, among other systems.

Data management platform 110 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. In one embodiment, the data management platform includes a data store 115 that stores scene data 117 collected, for example, from operation of one or more AVs. In some embodiments, scene data 117 may be training data provided from any source.

The simulation platform 120 can enable testing and validation of the algorithms, machine learning models, neural networks, and other development efforts for the AV, among other platforms and systems. The simulation platform 120 can replicate a variety of driving environments and/or reproduce real-world scenarios from data captured by the AV, including rendering geospatial information and road infrastructure (e.g., streets, lanes, crosswalks, traffic lights, stop signs, etc.); modeling the behavior of other vehicles, bicycles, pedestrians, and other dynamic elements; simulating inclement weather conditions, different traffic scenarios; and so on.

The AI/ML platform 130 can provide an infrastructure for training and evaluating machine learning algorithms for operating the AV, the simulation platform 120, and other platforms and systems. In one embodiment, the AI/ML platform 130 of system 100 may include a dataset generator 170, model trainer 180, and/or a model deployer 190. Using the dataset generator 170, model trainer 180, and/or the model deployer 190, data scientists can prepare data sets from the data management platform 110; select, design, and train machine learning models 195; evaluate, refine, and deploy the models 195; maintain, monitor, and retrain the models 195; and so on.

In embodiments herein, the simulation platform 120 and the AI/ML platform 130 implements approximately-paired simulation-to-real image translation. The simulation platform 120 can include an approximately-paired image generator 150 that receives real images 140 from collected scene data 117 of data management platform 110, and generates simulation images that are "approximately-paired" to the real images 140 and output from approximately-paired image generator 150 as approximately-paired images 155. "Approximate pairing" as discussed herein may refer to a pair of images including a real image and a simulation image that is generated from the real image and shares contextual information of the real image but can have some variations in assets, textures, and shapes, for example. The real images 140 may include scene data captured during operation of an AV, for example.

Each real image 140 may also include metadata and label information corresponding to the real image. This metadata and label information may be referred to herein as "contextual data" of the real image and can include, but is not limited to, identification of objects, scene composition, a pose of a sensor, map location, environment conditions, or lighting, for example. For each real image (source image), the approximately-paired image generator 150 can use the metadata and label information of the real image 140 to generate a corresponding simulated image (target image). The simulated image mirrors the camera pose of the real images 140 and are generated by combining assets and models similar to those in the real image 140 with a procedurally-generated background and matching lighting. Further details of the generation of an approximately-paired image pair are described further below with respect to FIG. 2.

The simulated image of approximately-paired images 155 may then be provided to simulated image translator 160 of the simulation platform 120 to apply simulation-to-real image translation on the simulated image. As previously discussed, the goal of sim-to-real training is to mimic the real images as closely as possible. But, due to limitations of the simulation, an exact match is difficult to achieve. To improve the matching between the simulated and real images in the approximately-paired images, the simulated image translator 160 applies approximately-paired simulation-to-real image translation to the simulated image to generate a post-processed simulated image 165.

The approximately-paired simulation-to-real image translation of embodiments herein may utilize machine learning to perform the image translation of a simulated image to a post-processed simulated image 165. In one embodiment, an ML model, such as a generative adversarial network (GAN), may be implemented at simulated image translator 160 to compute the difference between simulation and real image styles of the approximately-paired images 155 using a learned style encoder. The style encoder is designed so that the difference of style features can capture the differences in lighting, contrast, camera noise, scene fidelity, and other details. This difference in style features between the simulated image and the corresponding real image is used as an additional input to a generator network to guide image translation and improve the realism of the simulated image. Unlike previous image translation methods, embodiments herein leverages this additional style input and makes the translation task easier by having the model learn how to apply the difference, rather than having to learn what the difference is. In comparison, existing translation models encode the domain difference in their parameters, which makes the translation task more challenging. Further details of the approximately-paired simulation-to-real image translation using machine learning are described further below with respect to FIGS. 3A-3B.

The post-processed simulated image 165 can then be provided to the AI/ML platform 130 for use in training an ML model, such as an ML model to be deployed on an AV including, but not limited to, an object detection model, an image classification model, a video classification model, an object tracking model, or a trajectory prediction model, and so on. Dataset generator 170 can utilize the post-processed simulated image(s) 165 to supplement and/or generate a training/evaluation dataset 175. This training/evaluation dataset 175 can be used by model trainer 180 to train and/or evaluate a model 195 that is to be deployed by model deployer 190. In one embodiment, model deployer 190 can deploy AI/ML model 195 to one or more AVs.

Figure 2:
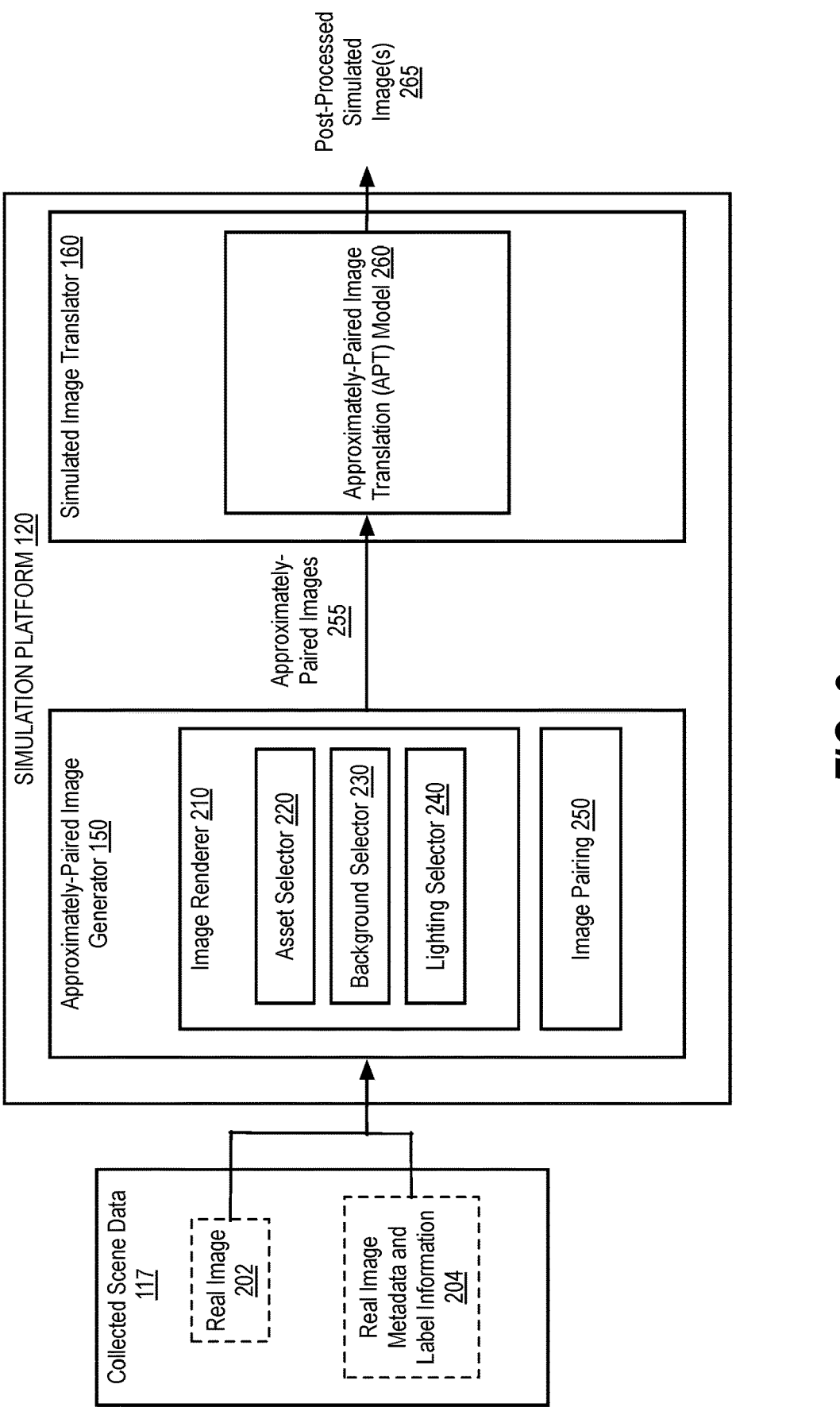
FIG. 2 is a block diagram of a detailed view of an example simulation platform providing for generation of an approximately-paired image pair, in accordance with embodiments herein.

FIG. 2 is a block diagram of a detailed view of an example simulation platform, such as simulation platform 120, providing for generation of an approximately-paired image pair, in accordance with embodiments herein. In one embodiment, simulation platform 120 is the same as simulation platform 120 described with respect to FIG. 1.

In one embodiment, simulation platform 120 learns a mapping G: x→y from simulated images x to real images y, in order to generate approximately-paired image pairs (x, y). As previously noted, unlike paired image translation, our pairs do not utilize pixel-wise alignment. Instead, the approximately-paired image generator 150 of the simulation platform 120 can sample a real image 202, y, from a real dataset, such as collected scene data 117, and generate a corresponding simulated image, x, by utilizing metadata and the label information 204 present in the real image 202. As the real images can be collected from sensors on an AV, the images have corresponding information about, for example, pose of the sensor, map location, environment conditions, lighting, etc. Such information is referred to herein as contextual information.

In one embodiment, the approximately-paired image generator includes an image renderer 210 that can utilize this contextual information to render a simulated image, x, in a graphics engine. The image rendered 210 can create a simulated version of each real object in the real image 202 by using asset selector 220, background selector 230, and lighting selector 240. Asset selector 220 can select an asset that corresponds to an object in the real image 202 from an asset library (not shown). The asset selector 220 can utilize the label(s) and other metadata 204 associated with the real image 202 as part of the asset selection process. The background selector 230 can select the background of the simulation scene from a procedurally-generated 3D map. In one embodiment, the background selector 230 may utilize, for example, the pose information of the AV that is included in metadata 204 to select the background. The lighting selector 240 can match the lighting of the simulated image to the real image 202 using, for example, an environment map that accounts for the time of day and weather conditions present in the real image 202.

The image rendered 210 may then construct a completed 3D scene by combining the selected assets, background, and lighting. This produces a simulated image that mirrors the camera pose of the real image 202. The image pairing 250 can mark or otherwise indicate the real image 202 and the generated simulated image as an approximately-paired image 255. The approximately-paired image generator 150 can repeat this process for each real image 202 and generate a dataset of N approximately-paired images 255, $\{x_i, y_i\}$, where $N_i=1$.

This scalable image generation process yields a dataset consisting of approximately-paired image pairs 255 that share attributes such as object size, type, background, scene composition, lighting, and camera pose. Much like unpaired data, approximately-paired data is cheap and efficient to generate, with minimal manual labeling and curation. In contrast, paired data utilizes substantial manual curation due to the use of pixel-level correspondence. However, like paired data, approximately-paired data incorporates contextual information that can guide the model and simplify the learning process, resulting in faster training and improved accuracy.

In one embodiment, the approximately-paired images 255 can be passed to the simulated image translator 160 of simulation platform 120 for use in training an approximately-paired image translation (APT) model 260 to generate post-processed simulated images 265. During training, the APT 260 model is fed with approximately paired image pairs 255. This pairing makes data generation more straightforward and improves supervision. At inference, the APT model 260 can be provided a style image (real image, y) that possesses a desired style for the post-processed simulated image 265. In some embodiments, this style image can be randomly selected from the training dataset. In one embodiment, the style image that is selected may have a timestamp that matches that of the simulated image input.

Figure 3A:
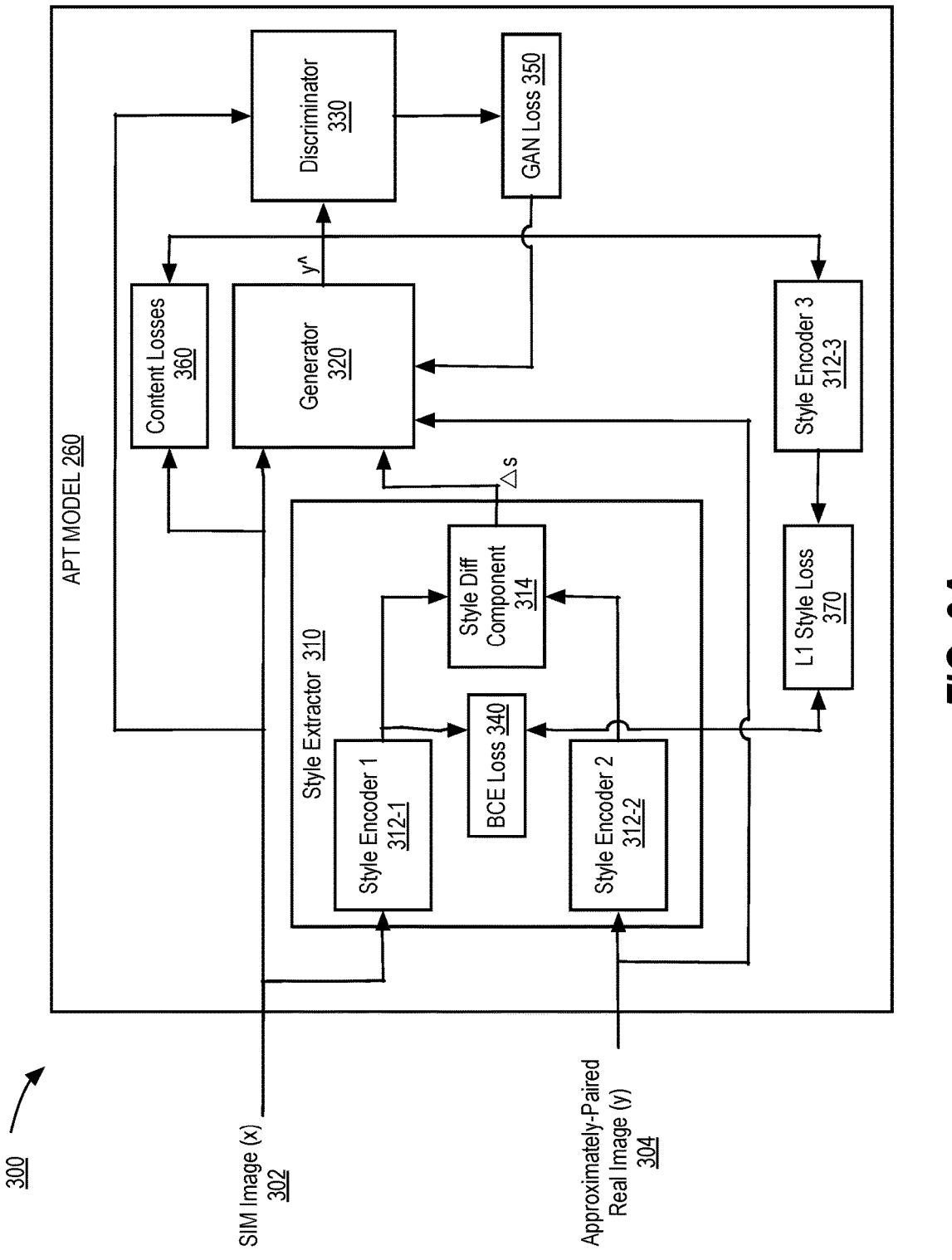
FIGS. 3A-3B are block diagrams of a detailed view of an approximately-paired image translation (APT) model for facilitating approximately-paired simulation-to-real image translation, in accordance with embodiments herein.
Figure 3B:
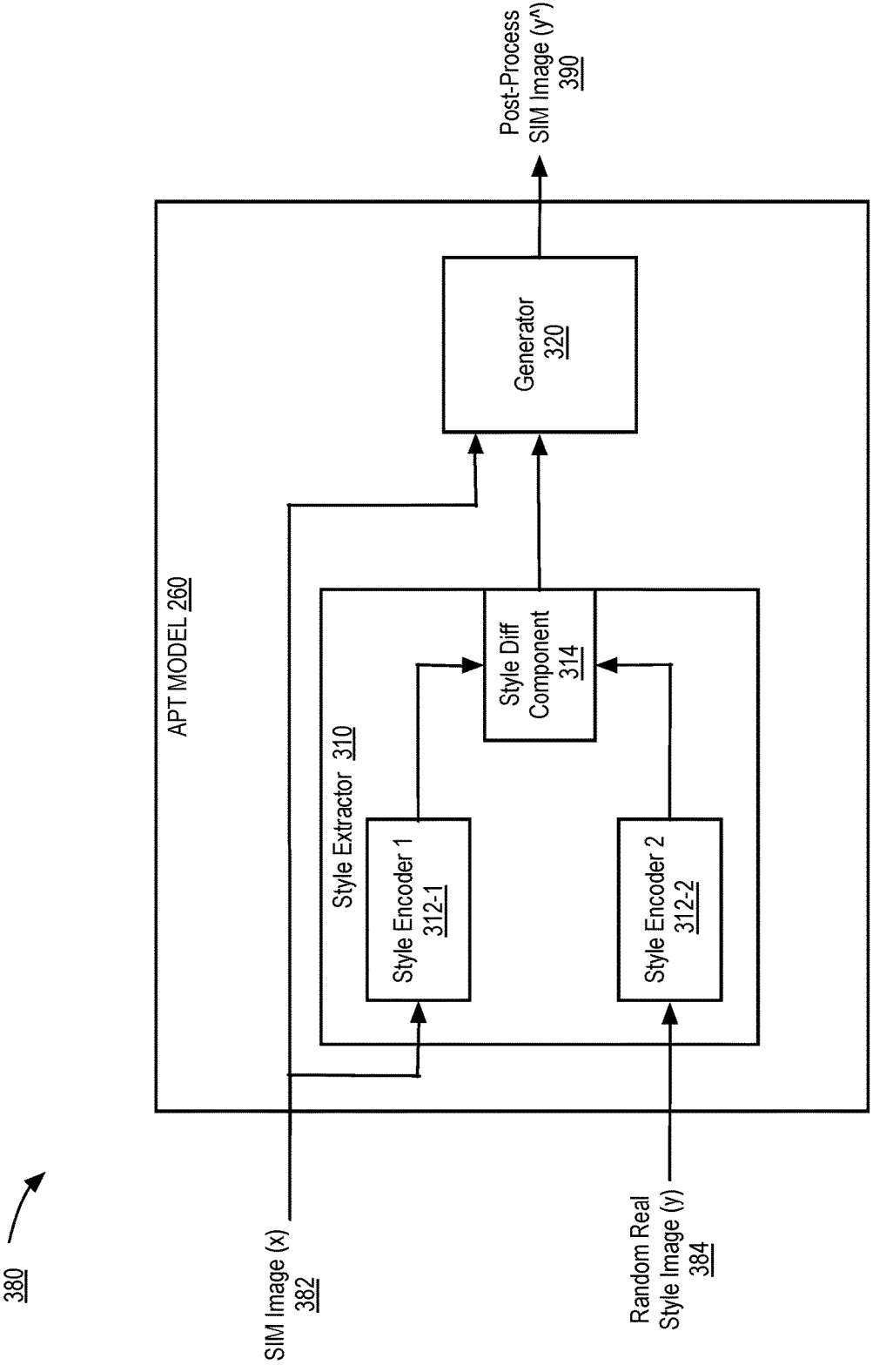

FIGS. 3A-3B are block diagrams of a detailed view of an APT model 260 for facilitating approximately-paired simulation-to-real image translation, in accordance with embodiments herein. In one embodiment, APT model 260 is the same as APT model 260 described with respect to FIG. 2.

FIG. 3A is a block diagram of a detailed view of training 300 of an APT model 260 for approximately-paired simulation-to-real image translation, in accordance with embodiments herein. APT model 260 is formulated as a one-sided GAN, and includes a style extractor 310 including style encoders (S) 312-1, 312-2, an additional style encoder 312-3 (S), a generator 320 (G), and a discriminator 330 (D). In one embodiment, the style encoders 312-1, 312-2, 312-3 may be collectively referred to as style encoders 312.

In one embodiment, a GAN is a class of Deep Learning framework, where two neural networks (e.g., a "generative network" (or generator) and a "discriminative network" (or discriminator)) contest with each other in a game (in the form of a zero-sum game, where one agent's gain is another agent's loss). Given a training set, the GAN learns to generate new data with the same statistics as the training set. For example, a GAN trained on photographs can generate new photographs that look at least superficially authentic to human observers, having many realistic characteristics. The core idea of a GAN is based on the "indirect" training through a discriminator, which itself is also being updated dynamically. This means that the generator is not trained to minimize distance to a specific reference image, but rather to fool the discriminator. This can enable the GAN to learn in an "unsupervised" manner.

As previously noted, the APT model 260 leverages approximately paired data to maximize its performance. For purposes of training of the APT model 260, the style extractor 310 includes one or more style encoders 312-1, 312-2 (S). A first style encoder 1 312-1 may receive a simulated (SIM) image 302 (x) as an input and generate a style code s=S(x) (e.g., style vector), which aims to capture global image properties such as contrast, image noise, color balance, sharpness of the SIM image 302. Style encoders 312 may use average pooling layers to help remove content information, such as location and pose of different objects present in the scene. As the second style encoder 2 312-2 may receive an approximately-paired real image 304 (y) to the SIM image 302 and generate a style code S(y). A style difference (diff) component 314 can determine a style difference, $\Delta s = S(y) - S(x)$, which is a difference between the two style codes output from style encoders 312-1, 312-2. The style difference may also be described as a d-dimensional learned latent code that represents the "realism gap" between the SIM image 302 (x) and the corresponding approximately-paired real image 304 (y).

The style difference (Δs) can be provided as an additional input to the generator 320, along with the SIM image 302, x. The style difference can be applied to the input SIM image 302, x, at the generator 320 to generate a post-processed simulated image, y^. In other words, the output image y^=G(x,Δs) is generated by applying the style difference, Δs, to the input simulated image X.

To prevent the generator 320 from over-fitting to the style input during training, the APT model 260 can implement several measures. In one embodiment, spatial content information can be removed from the style input of the approximately-paired real image 304 (y) by incorporating pooling layers in a neural network of the style encoders 312. In one embodiment, one or more content losses 360 can be utilized between the SIM image 302 (x) and the generated image y^ to ensure that the generated image y^ accurately reflects the content of the SIM image 302. These measures may help to cause the generator 320 to not solely focus on replicating the style of the real image 304, but also to focus on generating content accurate to the SIM image 302.

In one embodiment, the generator 320 (G) can include, for example, multiple ResNet blocks and translate the input SIM image 302 (x) into a realistic output image y^=G(x, Δs), guided by the style difference vector, Δs. The weights of the convolution layers in the generator, G, can be modulated and demodulated using the style difference vector, Δs. In one embodiment, a separate linear layer can be used to map the style difference vector Δs to the size of the weights in each convolution layer.

The discriminator 330 (D) may be trained to distinguish between the approximately-paired real image 304 (y) and the generated image y' from generator 320 (G), in a manner similar to standard GAN approaches. In one embodiment, the discriminator 330 (D) can be modeled with multiple convolution layers, producing a feature map of a lower resolution than the input image. Each location in the feature map may correspond to a patch in the input image, and the size of each patch is determined by the size of the receptive field of the output features. By classifying each location of the output feature map as real or fake, the discriminator 330 (D) can classify each patch in the input.

In embodiments herein, the APT model 260 may utilize loss functions to optimize training of the APT model 260. In one embodiment, the optimization may alternate between solving the following two optimization problems:

$$\min_{D} \mathbb{E}_{x,y}\left[(D(y) - 1)^2 + (D(G(x, \Delta s)) - 0)^2\right], \quad ($$

$$\min_{S,G} \mathcal{L}_{total}(S, G).$$

The above optimization problems employ the least squares adversarial loss, where the discriminator 330 (D) is trained to predict 0 for generated images and 1 for real images. The total loss for optimizing the generator 320 (G) and style encoder 312-3 (S), L_{total}, includes an adversarial loss aimed at fooling the discriminator 330 (D). The various components that make up the total loss function are detailed further below.

GAN loss 350 is an adversarial loss that aims to deceive the discriminator 330 (D) into classifying the generated images, y^, as real images. Deceiving the discriminator 330 (D) means that the generator 320 (G) aims to generate images y^ that will cause the discriminator 330 (D) to predict 1 for the generated images y^. In one example embodiment, given Δs=S(y)−S(x), the GAN loss 350 may be represented as:

$$\mathcal{L}_{GAN} = \mathbb{E}_{x,y}\left[(D(x, G(x, \Delta s)) - 1)^2\right]$$

Binary cross-entropy (BCE) loss 340 is a style classification loss. As noted above, the style encoders 312 defined task is to differentiate the styles of simulated and real images. To support this task, the BCE loss 340 can be utilized to separate the style vectors of SIM images 302 (x) and approximately-paired real images 304 (y). In one embodiment, a linear classifier can be trained to map the style vector to a scalar, which should be 0 for simulated style vectors and 1 for real style vectors. In one embodiment, the linear classifier may be represented by a d×1 matrix, W_s. In such an example, the BCE loss 340 may be defined as follows:

$$\mathcal{L}_{bce} = \mathbb{E}_{x,y}\left[(\log(f(W_s(S(y)))) + \log(1 - f(W_s(S(x))))\right]$$

In the equation above, f(•) is a Sigmoid function, i.e., f(x)=1/(1+e^{−x}). For improved stability and convergence during training, W_s can be pre-trained for a single epoch and then fine-tuned with a lower learning rate in conjunction with the other losses during the overall training process.

L1 style loss 370 may be referred to as a style reconstruction loss. In one embodiment, to enable style similarity between the generated images, ^y, and target images (approximately-paired real image 304 (y), the APT model 260 can aim to minimize the L1 style loss 370 between the style representations of ^y and y as follows:

$$\mathcal{L}_{sty} = \mathbb{E}_{y}[\|S(y) - S(\hat{y})\|_1]$$

In one embodiment, content losses 360 may include one or more content losses including, but not limited to, a content noise-contrastive estimation (NCE) loss, a content identity loss, and a content luminance loss, for example. The NCE loss may be used to enforce content similarity between the simulated image and the post-processed simulated image. The content identity loss may facilitate a zero style difference resulting in no modification to the simulation image. The content luminance loss may preserve content of the simulated image, the content comprising at least one of object locations, shaped, and edges.

With respect to the content NCE loss, this loss may be utilized to facilitate content similarity between the SIM image 302 (x) and the generated image y^. In one embodiment, the generator 320 (G) may include an encoder (G_{enc}) and a decoder component (G_{dec}), represented as G(x, Δs)=G_{dec}(G_{enc}(x, Δs)). Using G_{enc}, the encoded feature maps for the input image, x_{enc}, and the generated image, y^_{enc}, may be computed as follows: x_{enc}=G_{enc}(x, S(y)−S(x)) and y^_{enc}=G_{enc}(y^, S(y)−S(y^)).

Once the encoded feature maps are computed, the encoded feature vectors v^ from the feature map y^_{enc} and the corresponding positive and negative feature vectors, v^+ and v^−, from the simulated feature map x_{enc} can be sampled.

Note that $v^-$ and $v^\wedge$ correspond to the same spatial location, while $v^-$ and $v^\wedge$ correspond to different spatial locations in the feature map.

In one example, 'n' indices (e.g., n=256) from the generated feature map, $y^\wedge$, can be randomly sampled. Let this set of indices be represented as $K=\{k_1, \ldots, k_n\}$. For each spatial location $k \in K$, the following samples can be taken: $v^\wedge k = ^\wedge y_{enc}(k)$, positive feature $v^+_k = ^\wedge x_{enc}(k)$, negative feature $v^- k = ^\wedge x_{enc}(m)$, where $m \in K$ and $m \neq k$.

In one embodiment, using the triplet $(V^\wedge_k, v_k^+, v_k^-)$, the NCE loss may be defined as follows:

$$\ell_{nce}^{(k)} = -\log\left[\frac{\exp(\hat{v}_k \cdot v_k^+/\tau)}{\exp(\hat{v}_k \cdot v_k^+/\tau + \sum_{n=1}^{N}\exp(\hat{v}_k \cdot v_k^-/\tau))}\right],$$

$$\mathcal{L}_{NCE} = \mathbb{E}_{x,y}\left[\sum_{k \in K}\ell_{nce}^{(k)}\right],$$

In the equations above, the sum is over all the features sampled from an image (i.e., $(v^\wedge, v^+, v^-)$ triplets).

With respect to the content identity loss, this loss may facilitate a zero style difference resulting in no modification to the simulation image. As the input SIM image 302 (x) is modified by the generator 320 (G) using the style difference, a zero style difference should result in no modification to the input. To ensure this identity, the content identity loss can add an L1 loss between the input image and the generated image with a zero style difference, expressed as follows:

$$\mathcal{L}_{idt} = \mathbb{E}_x[\|G(x, 0) - x\|_1].$$

With respect to the content luminance loss, this loss aims to preserve the content of the image, such as object locations, shapes, and edges. A naive approach to preserve the content would be to make sure that the luminance component of the SIM image 302 (x) and generated image $y^\wedge$ is identical. However, this constraint would prevent the APT model 260 from making changes to style properties that are dependent on luminance, such as noise, overall brightness, and contrast. To overcome this limitation, the difference between normalized luminance patches of size 16×16 is minimized, as described in the example equation below:

$$\mathcal{L}_{lum} = \mathbb{E}_{x,y}\left[\left\|\frac{\overline{L}_x - \mu(\overline{L}_x)}{\sigma(\overline{L}_x)} - \frac{\overline{L}_y - \mu(\overline{L}_y)}{\sigma(\overline{L}_y)}\right\|_1\right],$$

In one example using the equation above, the luminance of an RGB image, such as SIM image 302 (x), is calculated as a weighted combination of its red, green, and blue channels, with $Lx=0.299Rx+0.587Gx+0.114Bx$. $\overline{L}x$ (or $\overline{L}y$) is output of a 16×16 average pooling operation with a stride of 16 on the input luminance Lx (or the generated luminance Ly). The $\mu(\cdot)$ and $\sigma(\cdot)$ denote the mean and the standard deviation functions, respectively.

As part of optimization during training, the APT model 260 may generate a total loss ($L_{total}$) by summing all of the above losses for style encoders 312 (S) and generator 320 (G) using the following example combination weights ($\lambda$).

$$\mathcal{L}_{total}(S, G) = \mathcal{L}_{GAN} + \lambda^{cls}\mathcal{L}_{bce} + \lambda^{sty}\mathcal{L}_{sty} + \lambda^{nce}\mathcal{L}_{nce} + \lambda^{idt}\mathcal{L}_{idt} + \lambda^{lum}\mathcal{L}_{lum}.$$

FIG. 3B is a block diagram of a detailed view of inference 380 of an APT model 260 for approximately-paired simulation-to-real image translation, in accordance with embodiments herein. Once the APT model 260 is trained, such as described above with respect to FIG. 3A, the APT model 260 may be applied during an inference phase to generate post-processed simulated images as part of an approximately-paired simulation-to-real image translation process. The inference phase of APT model 260 is shown in FIG. 3B. The APT model 260 can utilize a style extractor 310 having one or more style encoders 312-1, 312-2 (collectively referred to herein as style encoders 312) to extract style vectors from the SIM image 382 (x) and a random real style image 384 (y). A style diff component 314 can determine a style difference between the two style vectors identified by style encoders 312, and provide this style difference as an input to the trained generator 320.

The goal of the GAN of APT model 260 is to learn the generator 320 (G), so that it can take as input one or more SIM images 382 (x) and generate realistic post-processed SIM image(s) 390 reflecting the style of the random real style image 384 (y). At inference, the APT model 260 can be provided the random real style image 384 (y) that possesses a desired style for the post-processed simulated image 390. In some embodiments, this random real style image 384 (y) can be randomly selected from the training dataset. In one embodiment, the random real style image 384 (y) may be an image that has a timestamp that matches that of the SIM image 382 (x).

FIG. 4 illustrates an example method 400 implementing training for approximately-paired simulation-to-real image translation, in accordance with embodiments herein. Although the example method 400 depicts a particular sequence of operations, the sequence may be altered without departing from the scope of the disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some embodiments, the method 400 includes block 410 where a simulated image is generated from a real image using contextual information of the real image. In one embodiment, the simulated image and the real image are an approximately-paired image pair. An approximately-paired image pair may refer to a pair of images including a real image and a simulation image that is generated from the real image. The simulated image of the approximately-paired image pair shares contextual information of the real image but can have some variations in assets, textures, and shapes, for example. The contextual data of the real image may refer to metadata and label information of the real image and can include, but is not limited to, identification of objects, scene composition, a pose of a sensor, map location, environment conditions, or lighting, for example.

At block 420, the approximately-paired image pair is received for use in training a model comprising a GAN. In one embodiment, the GAN includes one or more style encoders, a generator neural network, and a discriminator neural network. Subsequently, at block 430, a style difference between a first style vector of the simulated image and a second style vector of the real image is determined. In one embodiment, the first style vector and the second style vector are to encode style features of the simulated image and the real image using a style encoder. In one embodiment, the style features can include at least one of contrast, color balance, sharpness, image noise, lighting, or scene fidelity, for example. Lastly, at block 440, the style difference and the simulated image are provided as input to the GAN of the model in order to train the GAN to generate a post-processed simulated image.

FIG. 5 illustrates an example method 500 for implementing inference for approximately-paired simulation-to-real image translation, in accordance with embodiments herein. Although the example method 500 depicts a particular sequence of operations, the sequence may be altered without departing from the scope of the disclosure. For example, some of the operations depicted may be performed in parallel or in a different sequence that does not materially affect the function of the method 500. In other examples, different components of an example device or system that implements the method 500 may perform functions at substantially the same time or in a specific sequence.

According to some embodiments, the method 500 includes block 510 where a simulated image and a real image are received at a trained model. In one embodiment, the trained model is trained using approximately-paired image pairs including training simulated images that are generated from training real images using contextual data of the training images. An approximately-paired image pair may refer to a pair of images including the training real image and the training simulation image (that is generated from the training real image). The training simulated image of the approximately-paired image pair shares contextual information of the training real image, but can have some variations in assets, textures, and shapes, for example. The contextual data of the training real image may refer to metadata and label information of the real image and can include, but is not limited to, identification of objects, scene composition, a pose of a sensor, map location, environment conditions, or lighting, for example.

Then, at block 520, Extract, using one or more style encoders, a first style vector is extracted from the simulated image and a second style vector is extracted from the real image. The first and second style vectors may be extracted using one or more style encoders of the trained model. In one embodiment, the first and second style vectors encode style features of the simulated image and the real image. In one embodiment, the style features can include at least one of contrast, color balance, sharpness, image noise, lighting, or scene fidelity, for example.

Subsequently, at block 530, a style difference is determined between the first style vector and the second style vector. At block 540, the simulated image and the style difference are inputted to a generator neural network of the trained model. In one embodiment, the trained model is trained using a GAN. In one embodiment, the GAN includes one or more style encoders, the generator neural network, and a discriminator neural network. Lastly, at block 550, a post-processed simulated image is generated by the generator neural network by applying the style difference to the simulated image.

Figure 6:
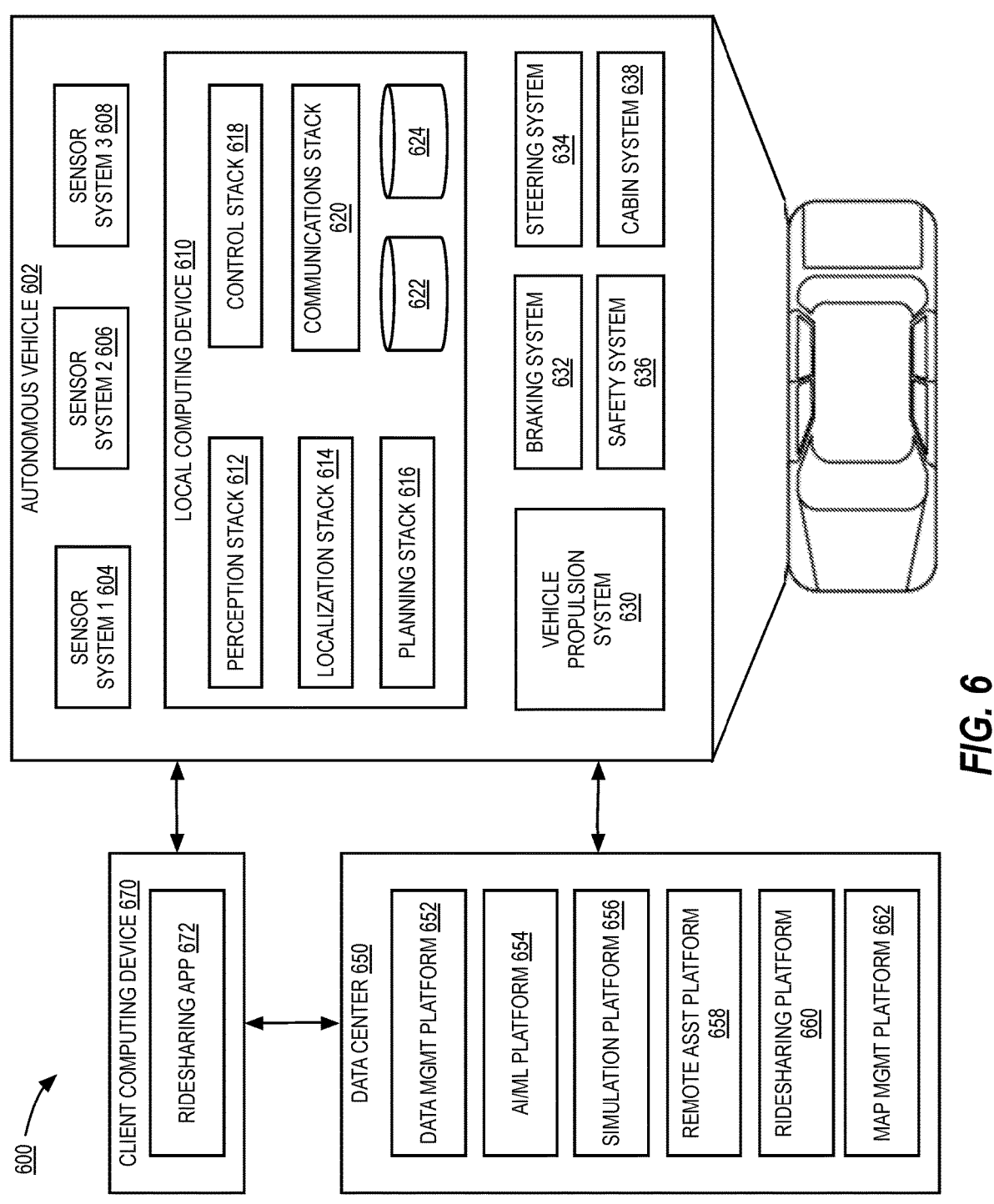
FIG. 6 illustrates an example system environment that can be used to facilitate autonomous vehicle (AV) dispatch and operations, according to some aspects of the disclosed technology.

Turning now to FIG. 6, this figure illustrates an example of an AV management system 600. In one embodiment, the AV management system 600 can implement a deep learning optimizer for fine-tuning while dynamically mitigating catastrophic forgetting, as described further herein. One of ordinary skill in the art will understand that, for the AV management system 600 and any system discussed in the disclosure, there can be additional or fewer components in similar or alternative configurations. The illustrations and examples provided in the disclosure are for conciseness and clarity. Other embodiments may include different numbers and/or types of elements, but one of ordinary skill the art will appreciate that such variations do not depart from the scope of the disclosure.

In this example, the AV management system 600 includes an AV 602, a data center 650, and a client computing device 670. The AV 602, the data center 650, and the client computing device 670 can communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 602 can navigate about roadways without a human driver based on sensor signals generated by multiple sensor systems 604, 606, and 608. The sensor systems 604-608 can include different types of sensors and can be arranged about the AV 602. For instance, the sensor systems 604-608 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 604 can be a camera system, the sensor system 606 can be a LIDAR system, and the sensor system 608 can be a RADAR system. Other embodiments may include any other number and type of sensors.

AV 602 can also include several mechanical systems that can be used to maneuver or operate AV 602. For instance, the mechanical systems can include vehicle propulsion system 630, braking system 632, steering system 634, safety system 636, and cabin system 638, among other systems. Vehicle propulsion system 630 can include an electric motor, an internal combustion engine, or both. The braking system 632 can include an engine brake, a wheel braking system (e.g., a disc braking system that utilizes brake pads), hydraulics, actuators, and/or any other suitable componentry configured to assist in decelerating AV 602. The steering system 634 can include suitable componentry configured to control the direction of movement of the AV 602 during navigation. Safety system 636 can include lights and signal indicators, a parking brake, airbags, and so forth. The cabin system 638 can include cabin temperature control systems, in-cabin entertainment systems, and so forth. In some embodiments, the AV 602 may not include human driver actuators (e.g., steering wheel, handbrake, foot brake pedal, foot accelerator pedal, turn signal lever, window wipers, etc.) for controlling the AV 602. Instead, the cabin system 638 can include one or more client interfaces (e.g., Graphical User Interfaces (GUIs), Voice User Interfaces (VUIs), etc.) for controlling certain aspects of the mechanical systems 630-638.

AV 602 can additionally include a local computing device 610 that is in communication with the sensor systems 604-608, the mechanical systems 630-638, the data center 650, and the client computing device 670, among other systems. The local computing device 610 can include one or more processors and memory, including instructions that can be executed by the one or more processors. The instructions can make up one or more software stacks or components responsible for controlling the AV 602; communicating with the data center 650, the client computing device 670, and other systems; receiving inputs from riders, passengers, and other entities within the AV's environment; logging metrics collected by the sensor systems 604-608; and so forth. In this example, the local computing device 610 includes a perception stack 612, a mapping and localization stack 614, a planning stack 616, a control stack 618, a communications stack 620, a High Definition (HD) geospatial database 622, and an AV operational database 624, among other stacks and systems.

Perception stack 612 can enable the AV 602 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 604-608, the mapping and localization stack 614, the HD geospatial database 622, other components of the AV, and other data sources (e.g., the data center 650, the client computing device 670, third-party data sources, etc.). The perception stack 612 can detect and classify objects and determine their current and predicted locations, speeds, directions, and the like. In addition, the perception stack 612 can determine the free space around the AV 602 (e.g., to maintain a safe distance from other objects, change lanes, park the AV, etc.). The perception stack 612 can also identify environmental uncertainties, such as where to look for moving objects, flag areas that may be obscured or blocked from view, and so forth.

Mapping and localization stack 614 can determine the AV's position and orientation (pose) using different methods from multiple systems (e.g., GPS, IMUs, cameras, LIDAR, RADAR, ultrasonic sensors, the HD geospatial database 622, etc.). For example, in some embodiments, the AV 602 can compare sensor data captured in real-time by the sensor systems 604-608 to data in the HD geospatial database 622 to determine its precise (e.g., accurate to the order of a few centimeters or less) position and orientation. The AV 602 can focus its search based on sensor data from one or more first sensor systems (e.g., GPS) by matching sensor data from one or more second sensor systems (e.g., LIDAR). If the mapping and localization information from one system is unavailable, the AV 602 can use mapping and localization information from a redundant system and/or from remote data sources.

The planning stack 616 can determine how to maneuver or operate the AV 602 safely and efficiently in its environment. For example, the planning stack 616 can receive the location, speed, and direction of the AV 602, geospatial data, data regarding objects sharing the road with the AV 602 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 602 from one point to another. The planning stack 616 can determine multiple sets of one or more mechanical operations that the AV 602 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the one to meet changing road conditions and events. If something unexpected happens, the planning stack 616 can select from multiple backup plans to carry out. For example, while preparing to change lanes to turn right at an intersection, another vehicle may aggressively cut into the destination lane, making the lane change unsafe. The planning stack 616 could have already determined an alternative plan for such an event, and upon its occurrence, help to direct the AV 602 to go around the block instead of blocking a current lane while waiting for an opening to change lanes.

The control stack 618 can manage the operation of the vehicle propulsion system 630, the braking system 632, the steering system 634, the safety system 636, and the cabin system 638. The control stack 618 can receive sensor signals from the sensor systems 604-608 as well as communicate with other stacks or components of the local computing device 610 or a remote system (e.g., the data center 650) to effectuate operation of the AV 602. For example, the control stack 618 can implement the final path or actions from the multiple paths or actions provided by the planning stack 616. This can involve turning the routes and decisions from the planning stack 616 into commands for the actuators that control the AV's steering, throttle, brake, and drive unit.

The communication stack 620 can transmit and receive signals between the various stacks and other components of the AV 602 and between the AV 602, the data center 650, the client computing device 670, and other remote systems. The communication stack 620 can enable the local computing device 610 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 620 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 622 can store HD maps and related data of the streets upon which the AV 602 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 624 can store raw AV data generated by the sensor systems 604-608 and other components of the AV 602 and/or data received by the AV 602 from remote systems (e.g., the data center 650, the client computing device 670, etc.). In some embodiments, the raw AV data can include HD LIDAR point cloud data, image or video data, RADAR data, GPS data, and other sensor data that the data center 650 can use for creating or updating AV geospatial data as discussed further below with respect to FIG. 7 and elsewhere in the disclosure.

The data center 650 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 650 can include one or more computing devices remote to the local computing device 610 for managing a fleet of AVs and AV-related services. For example, in addition to managing the AV 602, the data center 650 may also support a ridesharing service, a delivery service, a remote/roadside assistance service, street services (e.g., street mapping, street patrol, street cleaning, street metering, parking reservation, etc.), and the like.

The data center 650 can send and receive various signals to and from the AV 602 and the client computing device 670. These signals can include sensor data captured by the sensor systems 604-608, roadside assistance requests, software updates, ridesharing pick-up and drop-off instructions, and so forth. In this example, the data center 650 includes one or more of a data management platform 652, an Artificial Intelligence/Machine Learning (AI/ML) platform 654, a simulation platform 656, a remote assistance platform 658, a ridesharing platform 660, and a map management platform 662, among other systems.

Data management platform 652 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 650 can access data stored by the data management platform 652 to provide their respective services.

The AI/ML platform 654 can provide the infrastructure for training and evaluating machine learning algorithms for operating the AV 602, the simulation platform 656, the remote assistance platform 658, the ridesharing platform 660, the map management platform 662, and other platforms and systems. Using the AI/ML platform 654, data scientists can prepare data sets from the data management platform 652; select, design, and train machine learning models; evaluate, refine, and deploy the models; maintain, monitor, and retrain the models; and so on.

The simulation platform 656 can enable testing and validation of the algorithms, machine learning models, neural networks, and other development efforts for the AV 602, the remote assistance platform 658, the ridesharing platform 660, the map management platform 662, and other platforms and systems. The simulation platform 656 can replicate a variety of driving environments and/or reproduce real-world scenarios from data captured by the AV 602, including rendering geospatial information and road infrastructure (e.g., streets, lanes, crosswalks, traffic lights, stop signs, etc.) obtained from the map management platform 662; modeling the behavior of other vehicles, bicycles, pedestrians, and other dynamic elements; simulating inclement weather conditions, different traffic scenarios; and so on.

The remote assistance platform 658 can generate and transmit instructions regarding the operation of the AV 602. For example, in response to an output of the AI/ML platform 654 or other system of the data center 650, the remote assistance platform 658 can prepare instructions for one or more stacks or other components of the AV 602.

The ridesharing platform 660 can interact with a customer of a ridesharing service via a ridesharing application 672 executing on the client computing device 670. The client computing device 670 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 672. The client computing device 670 can be a customer's mobile computing device or a computing device integrated with the AV 602 (e.g., the local computing device 610). The ridesharing platform 660 can receive requests to be picked up or dropped off from the ridesharing application 672 and dispatch the AV 602 for the trip.

Map management platform 662 can provide a set of tools for the manipulation and management of geographic and spatial (geospatial) and related attribute data. The data management platform 652 can receive LIDAR point cloud data, image data (e.g., still image, video, etc.), RADAR data, GPS data, and other sensor data (e.g., raw data) from one or more AVs 602, Unmanned Aerial Vehicles (UAVs), satellites, third-party mapping services, and other sources of geospatially referenced data. The raw data can be processed, and map management platform 662 can render base representations (e.g., tiles (2D), bounding volumes (3D), etc.) of the AV geospatial data to enable users to view, query, label, edit, and otherwise interact with the data. Map management platform 662 can manage workflows and tasks for operating on the AV geospatial data. Map management platform 662 can control access to the AV geospatial data, including granting or limiting access to the AV geospatial data based on user-based, role-based, group-based, task-based, and other attribute-based access control mechanisms. Map management platform 662 can provide version control for the AV geospatial data, such as to track specific changes that (human or machine) map editors have made to the data and to revert changes. Map management platform 662 can administer release management of the AV geospatial data, including distributing suitable iterations of the data to different users, computing devices, AVs, and other consumers of HD maps. Map management platform 662 can provide analytics regarding the AV geospatial data and related data, such as to generate insights relating to the throughput and quality of mapping tasks.

In some embodiments, the map viewing services of map management platform 662 can be modularized and deployed as part of one or more of the platforms and systems of the data center 650. For example, the AI/ML platform 654 may incorporate the map viewing services for visualizing the effectiveness of various object detection or object classification models, the simulation platform 656 may incorporate the map viewing services for recreating and visualizing certain driving scenarios, the remote assistance platform 658 may incorporate the map viewing services for replaying traffic incidents to facilitate and coordinate aid, the ridesharing platform 660 may incorporate the map viewing services into the client application 672 to enable passengers to view the AV 602 in transit en route to a pick-up or drop-off location, and so on.

Figure 7:
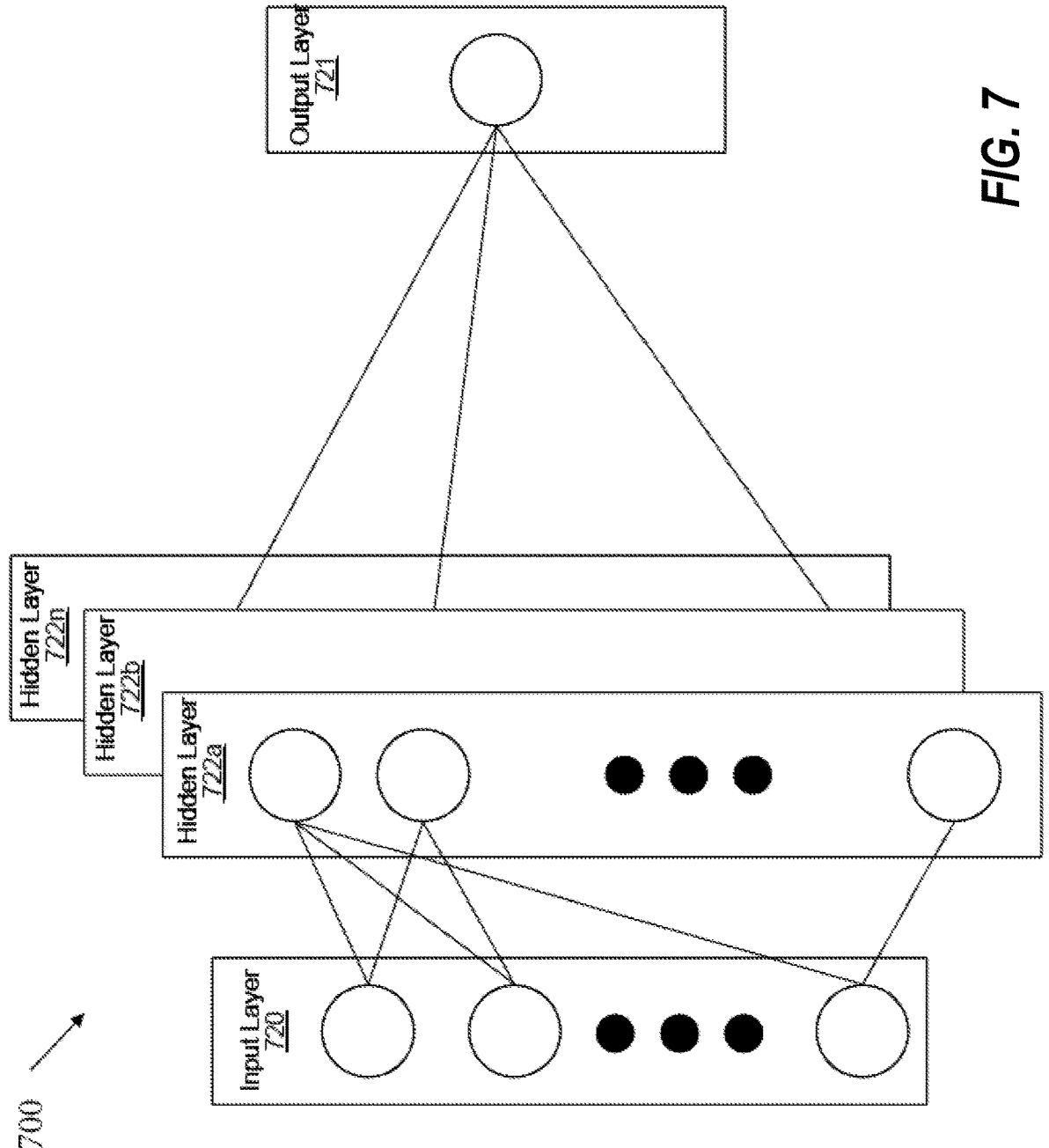
FIG. 7 illustrates an example of a deep learning neural network that can be used to implement a perception module and/or one or more validation modules, according to some aspects of the disclosed technology.

In FIG. 7, the disclosure now turns to a further discussion of models that can be used through the environments and techniques described herein. Specifically, FIG. 7 is an illustrative example of a deep learning neural network 700 that can be used to implement all or a portion of a perception module (or perception system) as discussed above. An input layer 720 can be configured to receive sensor data and/or data relating to an environment surrounding an AV. The neural network 700 includes multiple hidden layers 722a, 722b, through 722n. The hidden layers 722a, 722b, through 722n include "n" number of hidden layers, where "n" is an integer greater than or equal to one. The number of hidden layers can be made to include many layers for the given application. The neural network 700 further includes an output layer 721 that provides an output resulting from the processing performed by the hidden layers 722a, 722b, through 722n. In one illustrative example, the output layer 721 can provide estimated treatment parameters that can be used/ingested by a differential simulator to estimate a patient treatment outcome.

The neural network 700 is a multi-layer neural network of interconnected nodes. Each node can represent a piece of information. Information associated with the nodes is shared among the different layers and each layer retains information as information is processed. In some cases, the neural network 700 can include a feed-forward network, in which case there are no feedback connections where outputs of the network are fed back into itself. In some cases, the neural network 700 can include a recurrent neural network, which can have loops that allow information to be carried across nodes while reading in input.

Information can be exchanged between nodes through node-to-node interconnections between the various layers. Nodes of the input layer 720 can activate a set of nodes in the first hidden layer 722a. For example, as shown, each of the input nodes of the input layer 720 is connected to each of the nodes of the first hidden layer 722a. The nodes of the first hidden layer 722a can transform the information of each input node by applying activation functions to the input node information. The information derived from the transformation can then be passed to and can activate the nodes of the next hidden layer 722b, which can perform their own designated functions. Example functions include convolutional, up-sampling, data transformation, and/or any other suitable functions. The output of the hidden layer 722b can then activate nodes of the next hidden layer, and so on. The output of the last hidden layer 722n can activate one or more nodes of the output layer 721, at which an output is provided. In some cases, while nodes in the neural network 700 are shown as having multiple output lines, a node can have a single output and all lines shown as being output from a node represent the same output value.

In some cases, each node or interconnection between nodes can have a weight that is a set of parameters derived from the training of the neural network 700. Once the neural network 700 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 700 to be adaptive to inputs and able to learn as more and more data is processed.

The neural network 700 is pre-trained to process the features from the data in the input layer 720 using the different hidden layers 722a, 722b, through 722n in order to provide the output through the output layer 721.

In some cases, the neural network 700 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 700 is trained well enough so that the weights of the layers are accurately tuned.

To perform training, a loss function can be used to analyze errors in the output. Any suitable loss function definition can be used, such as a Cross-Entropy loss. Another example of a loss function includes the mean squared error (MSE), defined as $E\_total => \Sigma(\frac{1}{2}(target-output)^2)$. The loss can be set to be equal to the value of E_total.

The loss (or error) will be high for the initial training data since the actual values will be much different than the predicted output. The goal of training is to minimize the amount of loss so that the predicted output is the same as the training output. The neural network 700 can perform a backward pass by determining which inputs (weights) most contributed to the loss of the network, and can adjust the weights so that the loss decreases and is eventually minimized.

The neural network 700 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for down sampling), and fully connected layers. The neural network 700 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Min-wise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 8:
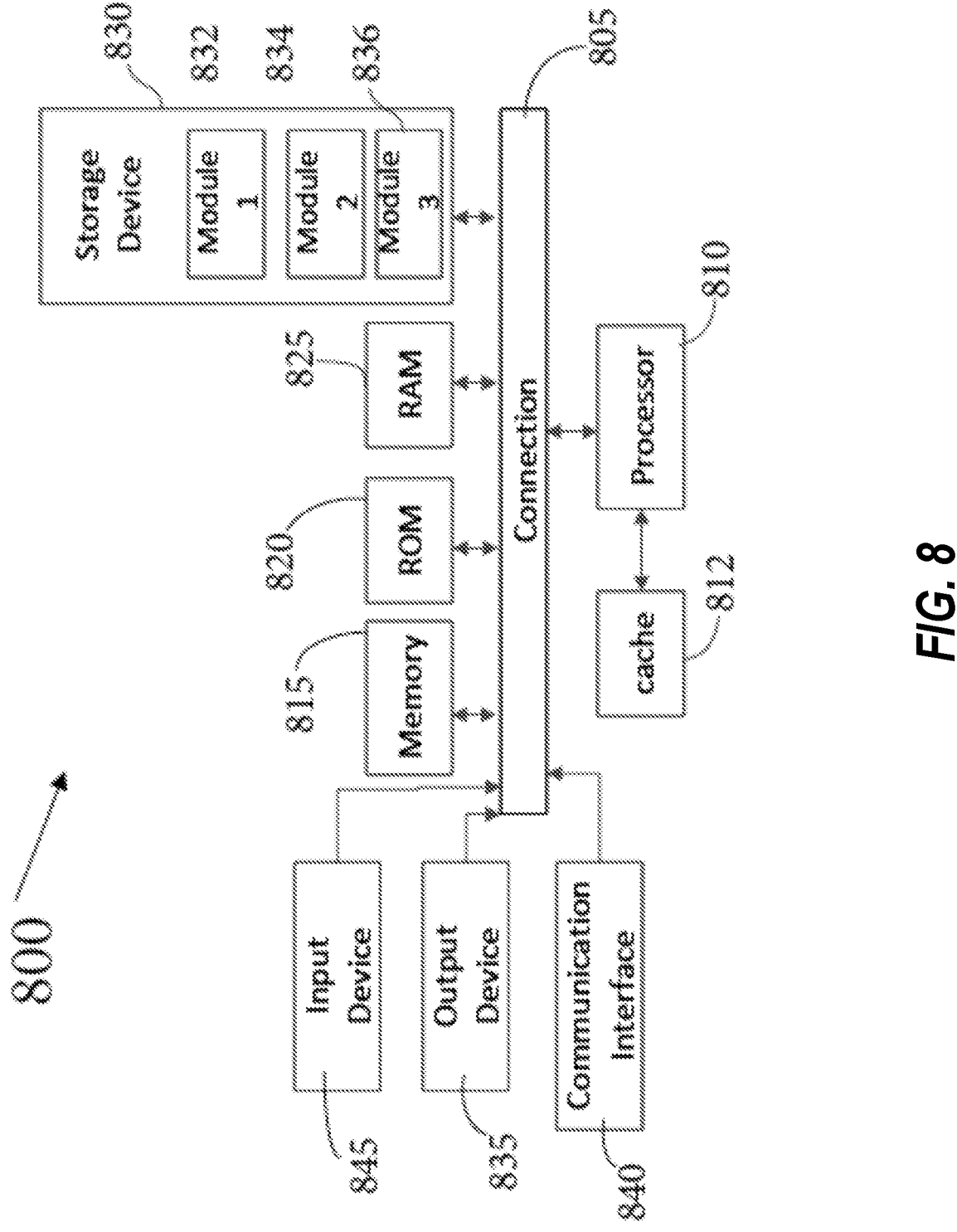
FIG. 8 illustrates an example processor-based system with which some aspects of the subject technology can be implemented.

FIG. 8 illustrates an example processor-based system with which some aspects of the subject technology can be implemented. For example, processor-based system 800 can be any computing device making up, or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 800 includes at least one processing unit (Central Processing Unit (CPU) or processor) 810 and connection 805 that couples various system components including system memory 815, such as Read-Only Memory (ROM) 820 and Random-Access Memory (RAM) 825 to processor 810. Computing system 800 can include a cache of high-speed memory 812 connected directly with, in close proximity to, or integrated as part of processor 810.

Processor 810 can include any general-purpose processor and a hardware service or software service, such as services 832, 834, and 836 stored in storage device 830, configured to control processor 810 as well as a special-purpose processor where software instructions are incorporated into the actual processor design. Processor 810 may be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLU-ETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communications interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLO-NASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 830 can include software services, servers, services, etc., that when the code that defines such software is executed by the processor 810, it causes the system 800 to perform a function. In some embodiments, a hardware service that performs a particular function can include the software component stored in a computer-readable medium in connection with hardware components, such as processor 810, connection 805, output device 835, etc., to carry out the function.

Embodiments within the scope of the disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

SELECTED EXAMPLES

Example 1 includes a method for facilitating approximately-paired simulation-to-real image translation, where the method comprising receiving, by a processing device performing training on a model, an approximately-paired image pair comprising a real image and a simulated image, wherein the simulated image is generated from the real image using contextual data of the real image; determining, by the processing device using a style encoder of the model, a style difference between a first style vector of the simulated image and a second style vector of the real image, wherein the first style vector and the second style vector encode style features of the simulated image and the real image using a style encoder; and inputting the style difference and the simulated image to a generative adversarial network (GAN) of the model to train the GAN to generate a post-processed simulated image.

In Example 2, the subject matter of Example 1 can optionally include wherein the model comprises a machine learning model for an autonomous vehicle (AV). In Example 3, the subject matter of any one of Examples 1-2 can optionally include wherein the style features comprise at least one of contrast, color balance, sharpness, image noise, lighting, or scene fidelity. In Example 4, the subject matter of any one of Examples 1-3 can optionally include wherein the GAN comprises a generator neural network and a discriminator neural network, wherein the generator neural network is to translate the simulated image into the post-processed simulated image based on the style difference, and wherein the discriminator neural network is to distinguish between the post-processed simulated image and the real image.

In Example 5, the subject matter of any one of Examples 1-4 can optionally include wherein a trained version of the generator neural network is utilized during an inference phase to: receive the simulated image and a style difference between the simulated image and a random real style image; and generate the post-processed simulated image. In Example 6, the subject matter of any one of Examples 1-5 can optionally include wherein the contextual data comprises metadata and label data of the real image, the metadata and the label data comprising one or more of identification of objects, a pose of a sensor, map location, environment conditions, and lighting.

In Example 7, the subject matter of any one of Examples 1-6 can optionally include wherein generating the simulated image from the real image further comprises: utilizing the metadata and the label data corresponding to the real image to select assets corresponding to the objects in the real image, select a background corresponding to the real image, and select lighting corresponding to the real image; render the simulated image using the selected assets, the selected background, and the selected lighting; and indicate that the simulated image and the real image are the approximately-paired image pair. In Example 8, the subject matter of any one of Examples 1-7 can optionally include wherein training the GAN comprises utilizing losses to optimize the GAN, the losses comprising at least one of an adversarial loss, a style classification loss, a style reconstruction loss, or a content loss. In Example 9, the subject matter of any one of Examples 1-8 can optionally include wherein the content loss comprises a Noise-Contrastive Estimation (NCE) loss, an identity loss, and a luminance loss.

Example 10 includes an apparatus for facilitating approximately-paired simulation-to-real image translation, the apparatus of Example 10 comprising one or more hardware processors to: receive, by a processing device performing training on a model, an approximately-paired image pair comprising a real image and a simulated image, wherein the simulated image is generated from the real image using contextual data of the real image; determine, by the processing device using a style encoder of the model, a style difference between a first style vector of the simulated image and a second style vector of the real image, wherein the first style vector and the second style vector encode style features of the simulated image and the real image using a style encoder; and input the style difference and the simulated image to a generative adversarial network (GAN) of the model to train the GAN to generate a post-processed simulated image.

In Example 11, the subject matter of Example 10 can optionally include wherein the style features comprise at least one of contrast, color balance, sharpness, image noise, lighting, or scene fidelity. In Example 12, the subject matter of Examples 10-11 can optionally include wherein the GAN comprises a generator neural network and a discriminator neural network, wherein the generator neural network is to translate the simulated image into the post-processed simulated image based on the style difference, and wherein the discriminator neural network is to distinguish between the post-processed simulated image and the real image.

In Example 13, the subject matter of Examples 10-12 can optionally include wherein a trained version of the generator neural network is utilized during an inference phase to: receive the simulated image and a style difference between the simulated image and a random real style image; and generate the post-processed simulated image. In Example 14, the subject matter of Examples 10-13 can optionally include wherein the contextual data comprises metadata and label data of the real image, the metadata and label data comprising one or more of identification of objects, a pose of a sensor, map location, environment conditions, and lighting.

In Example 15, the subject matter of Examples 10-14 can optionally include wherein generating the simulated image from the real image further comprises: utilizing the metadata and the label data corresponding to the real image to select assets corresponding to the objects in the real image, select a background corresponding to the real image, and select lighting corresponding to the real image; render the simulated image using the selected assets, the selected background, and the selected lighting; and indicate that the simulated image and the real image are the approximately-paired image pair.

Example 16 is a non-transitory computer-readable storage medium for facilitating approximately-paired simulation-to-real image translation. The non-transitory computer-readable storage medium of Example 16 having stored thereon executable computer program instructions that, when executed by one or more processors, cause the one or more processors to: receive, by the one or more processors performing hosting a trained model, a simulated image and a real image, wherein the trained model is trained using approximately-paired image pairs comprising training simulated images generated from training real images using contextual data of the training real images; extract, by the one or more processors using one or more style encoders of the trained model, a first style vector from the simulated image and a second style vector from the real image, wherein the first style vector and the second style vector are to encode style features of the simulated image and the real image; determine a style difference between the first style vector and second style vector; input the simulated image and the style difference to a generator neural network of the trained model; and generate, by the generator neural network, a post-processed simulated image by applying the style difference to the simulated image.

In Example 17, the subject matter of Example 16 can optionally include wherein the generator neural network is trained as a generative adversarial network (GAN) using the generator neural network and a discriminator neural network, wherein the generator neural network is to translate the simulated image into the post-processed simulated image based on the style difference, and wherein the discriminator neural network is to distinguish between the post-processed simulated image and the real image. In Example 18, the subject matter of Examples 16-17 can optionally include wherein the style features comprise at least one of contrast, color balance, sharpness, image noise, lighting, or scene fidelity.

In Example 19, the subject matter of Examples 16-18 can optionally include wherein the real image comprises a first timestamp that matches a second timestamp of the simulated image. In Example 20, the subject matter of Examples 16-19 can optionally include wherein the contextual data comprises metadata and label data of the real image, the metadata and label data comprising one or more of identification of objects, a pose of a sensor, map location, environment conditions, and lighting, and wherein the training simulated images are generated from the training real images by: utilizing the metadata and the label data corresponding to the training real images to select assets corresponding to objects in the training real images, select a background corresponding to the training real images, and select lighting corresponding to the training real images; rendering the training simulated images using the selected assets, the selected background, and the selected lighting; and indicating the training simulated images and the training real images as the approximately-paired image pairs.

Example 21 is a system for facilitating approximately-paired simulation-to-real image translation. The system of Example 21 can optionally include a memory to store a block of data, and one or more hardware processors communicably coupled to the memory, wherein the one or more hardware processors are to: receiving, by a processing device performing training on a model, an approximately-paired image pair comprising a real image and a simulated image, wherein the simulated image is generated from the real image using contextual data of the real image; determining, by the processing device using a style encoder of the model, a style difference between a first style vector of the simulated image and a second style vector of the real image, wherein the first style vector and the second style vector encode style features of the simulated image and the real image using a style encoder; and inputting the style difference and the simulated image to a generative adversarial network (GAN) of the model to train the GAN to generate a post-processed simulated image.

In Example 21, the subject matter of Example 20 can optionally include wherein the style features comprise at least one of contrast, color balance, sharpness, image noise, lighting, or scene fidelity. In Example 22, the subject matter of Examples 20-21 can optionally include wherein the GAN comprises a generator neural network and a discriminator neural network, wherein the generator neural network is to translate the simulated image into the post-processed simulated image based on the style difference, and wherein the discriminator neural network is to distinguish between the post-processed simulated image and the real image.

In Example 23, the subject matter of Examples 20-22 can optionally include wherein a trained version of the generator neural network is utilized during an inference phase to: receive the simulated image and a style difference between the simulated image and a random real style image; and generate the post-processed simulated image. In Example 24, the subject matter of Examples 20-23 can optionally include wherein the contextual data comprises metadata and label data of the real image, the metadata and label data comprising one or more of identification of objects, a pose of a sensor, map location, environment conditions, and lighting.

In Example 25, the subject matter of Examples 20-24 can optionally include wherein generating the simulated image from the real image further comprises: utilizing the metadata and the label data corresponding to the real image to select assets corresponding to the objects in the real image, select a background corresponding to the real image, and select lighting corresponding to the real image; render the simulated image using the selected assets, the selected background, and the selected lighting; and indicate that the simulated image and the real image are the approximately-paired image pair.

Example 26 includes an apparatus comprising means for performing the method of any of the Examples 1-9. Example 27 is at least one machine readable medium comprising a plurality of instructions that in response to being executed on a computing device, cause the computing device to carry out a method according to any one of Examples 1-9. Example 28 is an apparatus for facilitating approximately-paired simulation-to-real image translation, configured to perform the method of any one of Examples 1-10. Specifics in the Examples may be used anywhere in one or more embodiments.

The various embodiments described above are provided by way of illustration and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A method comprising:
receiving, by a processing device performing training on a model, an approximately-paired image pair comprising a real image and a simulated image, wherein the simulated image is generated from the real image using contextual data of the real image;
determining, by the processing device using a style encoder of the model, a style difference between a first style vector of the simulated image and a second style vector of the real image, wherein the first style vector and the second style vector encode style features of the simulated image and the real image using a style encoder; and
inputting the style difference and the simulated image to a generative adversarial network (GAN) of the model to train the GAN to generate a post-processed simulated image.

2. The method of claim 1, wherein the model comprises a machine learning model for an autonomous vehicle (AV).

3. The method of claim 1, wherein the style features comprise at least one of contrast, color balance, sharpness, image noise, lighting, or scene fidelity.

4. The method of claim 1, wherein the GAN comprises a generator neural network and a discriminator neural network, wherein the generator neural network is to translate the simulated image into the post-processed simulated image based on the style difference, and wherein the discriminator neural network is to distinguish between the post-processed simulated image and the real image.

5. The method of claim 4, wherein a trained version of the generator neural network is utilized during an inference phase to:
receive the simulated image and a style difference between the simulated image and a random real style image; and
generate the post-processed simulated image.

6. The method of claim 1, wherein the contextual data comprises metadata and label data of the real image, the metadata and the label data comprising one or more of identification of objects, a pose of a sensor, map location, environment conditions, and lighting.

7. The method of claim 6, wherein generating the simulated image from the real image further comprises:
utilizing the metadata and the label data corresponding to the real image to select assets corresponding to the objects in the real image, select a background corresponding to the real image, and select lighting corresponding to the real image;
render the simulated image using the selected assets, the selected background, and the selected lighting; and
indicate that the simulated image and the real image are the approximately-paired image pair.

8. The method of claim 1, wherein training the GAN comprises utilizing losses to optimize the GAN, the losses comprising at least one of an adversarial loss, a style classification loss, a style reconstruction loss, or a content loss.

9. The method of claim 8, wherein the content loss comprises a Noise-Contrastive Estimation (NCE) loss, an identity loss, and a luminance loss.

10. An apparatus comprising:
one or more hardware processors to:
receive, by a processing device performing training on a model, an approximately-paired image pair comprising a real image and a simulated image, wherein the simulated image is generated from the real image using contextual data of the real image;
determine, by the processing device using a style encoder of the model, a style difference between a first style vector of the simulated image and a second style vector of the real image, wherein the first style vector and the second style vector encode style features of the simulated image and the real image using a style encoder; and
input the style difference and the simulated image to a generative adversarial network (GAN) of the model to train the GAN to generate a post-processed simulated image.

11. The apparatus of claim 10, wherein the style features comprise at least one of contrast, color balance, sharpness, image noise, lighting, or scene fidelity.

12. The apparatus of claim 10, wherein the GAN comprises a generator neural network and a discriminator neural network, wherein the generator neural network is to translate the simulated image into the post-processed simulated image based on the style difference, and wherein the discriminator neural network is to distinguish between the post-processed simulated image and the real image.

13. The apparatus of claim 12, wherein a trained version of the generator neural network is utilized during an inference phase to:
receive the simulated image and a style difference between the simulated image and a random real style image; and
generate the post-processed simulated image.

14. The apparatus of claim 10, wherein the contextual data comprises metadata and label data of the real image, the metadata and label data comprising one or more of identification of objects, a pose of a sensor, map location, environment conditions, and lighting.

15. The apparatus of claim 14, wherein generating the simulated image from the real image further comprises:

utilizing the metadata and the label data corresponding to the real image to select assets corresponding to the objects in the real image, select a background corresponding to the real image, and select lighting corresponding to the real image;

render the simulated image using the selected assets, the selected background, and the selected lighting; and indicate that the simulated image and the real image are the approximately-paired image pair.

16. A non-transitory computer-readable medium having stored thereon instructions that, when executed by one or more processors, cause the one or more processors to:

receive, by the one or more processors performing hosting a trained model, a simulated image and a real image, wherein the trained model is trained using approximately-paired image pairs comprising training simulated images generated from training real images using contextual data of the training real images;

extract, by the one or more processors using one or more style encoders of the trained model, a first style vector from the simulated image and a second style vector from the real image, wherein the first style vector and the second style vector are to encode style features of the simulated image and the real image;

determine a style difference between the first style vector and second style vector;

input the simulated image and the style difference to a generator neural network of the trained model; and generate, by the generator neural network, a post-processed simulated image by applying the style difference to the simulated image.

17. The non-transitory computer-readable medium of claim 16, wherein the generator neural network is trained as a generative adversarial network (GAN) using the generator neural network and a discriminator neural network, wherein the generator neural network is to translate the simulated image into the post-processed simulated image based on the style difference, and wherein the discriminator neural network is to distinguish between the post-processed simulated image and the real image.

18. The non-transitory computer-readable medium of claim 16, wherein the style features comprise at least one of contrast, color balance, sharpness, image noise, lighting, or scene fidelity.

19. The non-transitory computer-readable medium of claim 16, wherein the real image comprises a first timestamp that matches a second timestamp of the simulated image.

20. The non-transitory computer-readable medium of claim 16, wherein the contextual data comprises metadata and label data of the real image, the metadata and label data comprising one or more of identification of objects, a pose of a sensor, map location, environment conditions, and lighting, and wherein the training simulated images are generated from the training real images by:

utilizing the metadata and the label data corresponding to the training real images to select assets corresponding to objects in the training real images, select a background corresponding to the training real images, and select lighting corresponding to the training real images;

rendering the training simulated images using the selected assets, the selected background, and the selected lighting; and indicating the training simulated images and the training real images as the approximately-paired image pairs.

* * * * *